(12) United States Patent
Abe et al.

(10) Patent No.: US 11,028,637 B2
(45) Date of Patent: Jun. 8, 2021

(54) GLASS PANEL UNIT, BUILDING COMPONENT, AND METHOD FOR ACTIVATING GAS ADSORBENT

(71) Applicant: PANASONIC INTELLECTUAL PROPERTY MANAGEMENT CO., LTD., Osaka (JP)

(72) Inventors: Hiroyuki Abe, Osaka (JP); Eiichi Uriu, Osaka (JP); Kazuya Hasegawa, Osaka (JP); Tasuku Ishibashi, Ishikawa (JP); Masataka Nonaka, Osaka (JP); Takeshi Shimizu, Toyama (JP); Haruhiko Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/622,194

(22) PCT Filed: Jun. 26, 2018

(86) PCT No.: PCT/JP2018/024124
§ 371 (c)(1),
(2) Date: Dec. 12, 2019

(87) PCT Pub. No.: WO2019/004174
PCT Pub. Date: Jan. 3, 2019

(65) Prior Publication Data
US 2020/0131841 A1 Apr. 30, 2020

(30) Foreign Application Priority Data

Jun. 30, 2017 (JP) .............................. JP2017-129886

(51) Int. Cl.
*E06B 3/66* (2006.01)
*B32B 3/18* (2006.01)
(Continued)

(52) U.S. Cl.
CPC .............. *E06B 3/6612* (2013.01); *B32B 3/18* (2013.01); *B32B 17/06* (2013.01); *C03B 23/245* (2013.01);
(Continued)

(58) Field of Classification Search
CPC .......... E06B 3/6612; E06B 3/663; E06B 3/66; E06B 3/6736; E06B 3/6775;
(Continued)

(56) References Cited

U.S. PATENT DOCUMENTS

| | | | |
|---|---|---|---|
| 6,514,430 B1 * | 2/2003 | Corazza | ................ H01J 17/186 252/181.1 |
| 2014/0037870 A1 | 2/2014 | Petrmichl et al. | |

(Continued)

FOREIGN PATENT DOCUMENTS

| | | |
|---|---|---|
| CA | 1174221 A | 9/1984 |
| EP | 2 750 790 | 7/2014 |

(Continued)

OTHER PUBLICATIONS

International Search Report and Written Opinion issued in International Patent Application No. PCT/JP2018/024124 dated Sep. 25, 2018; with partial English translation.

(Continued)

*Primary Examiner* — Donald J Loney
(74) *Attorney, Agent, or Firm* — McDermott Will and Emery LLP

(57) ABSTRACT

A glass panel unit includes a first panel, a second panel, a sealing portion in a frame shape, a plurality of pillars, and a gas adsorbent. The sealing portion in the frame shape hermetically bonds respective peripheral edges of the first panel and the second panel together so as to create an evacuated, hermetically sealed space between the first panel and the second panel. The plurality of pillars and the gas (Continued)

adsorbent are arranged in the hermetically sealed space. The gas adsorbent contains: a non-metallic getter material having a porous structure with the ability to adsorb gas molecules; and a metallic getter material having a metallic surface with the ability to adsorb gas molecules.

5 Claims, 20 Drawing Sheets

(51) Int. Cl.
*B32B 17/06* (2006.01)
*C03B 23/24* (2006.01)
*E06B 3/663* (2006.01)
*E06B 3/677* (2006.01)
*E06B 3/673* (2006.01)

(52) U.S. Cl.
CPC ........ *E06B 3/663* (2013.01); *B32B 2307/724* (2013.01); *B32B 2315/08* (2013.01); *B32B 2419/00* (2013.01); *E06B 3/6736* (2013.01); *E06B 3/6775* (2013.01)

(58) Field of Classification Search
CPC ............ B32B 2419/00; B32B 2315/08; B32B 2307/724; Y02B 80/22; Y02A 30/249
See application file for complete search history.

(56) References Cited

U.S. PATENT DOCUMENTS

| | | |
|---|---|---|
| 2016/0001524 A1 | 1/2016 | Abe et al. |
| 2017/0292892 A1 | 10/2017 | Ishibashi et al. |
| 2018/0245397 A1 | 8/2018 | Abe et al. |
| 2018/0290435 A1 | 10/2018 | Abe et al. |
| 2019/0055775 A1 | 2/2019 | Abe et al. |
| 2020/0109594 A1 | 4/2020 | Abe et al. |

FOREIGN PATENT DOCUMENTS

| | | |
|---|---|---|
| JP | S58-000243 A | 1/1983 |
| JP | 2001-180985 A | 7/2001 |
| JP | 2008-063158 | 3/2008 |
| JP | 2015-524380 A | 8/2015 |
| JP | 2016-069232 A | 5/2016 |
| WO | 2014/022109 A1 | 2/2014 |
| WO | 2014/136151 A1 | 9/2014 |
| WO | 2016/051714 A1 | 4/2016 |
| WO | 2017/043059 A1 | 3/2017 |
| WO | 2017/056421 A1 | 4/2017 |

OTHER PUBLICATIONS

Extended European Search Report search report dated Jun. 23, 2020, issued for the corresponding European Patent Application No. 18825148.2.

* cited by examiner

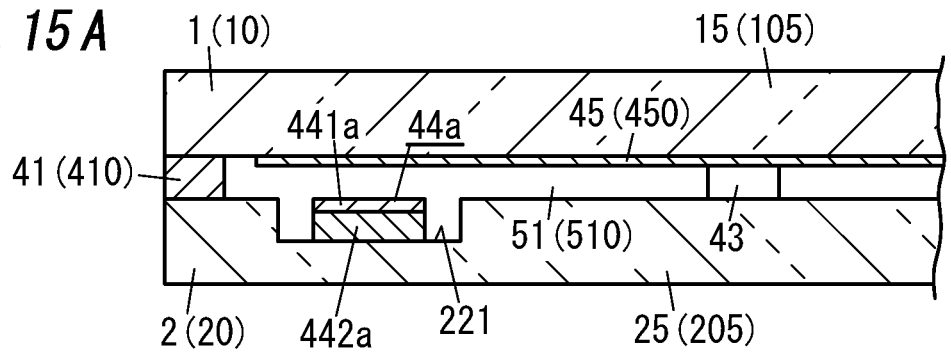
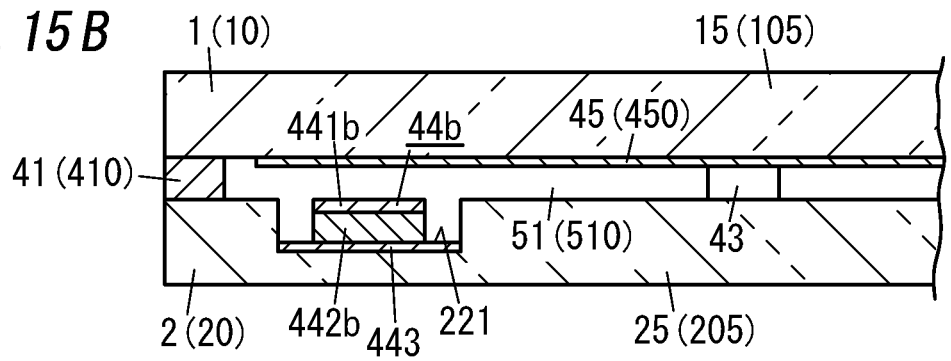
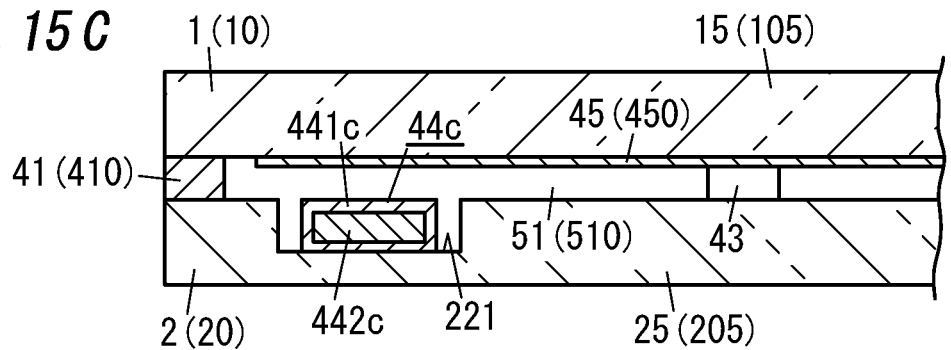
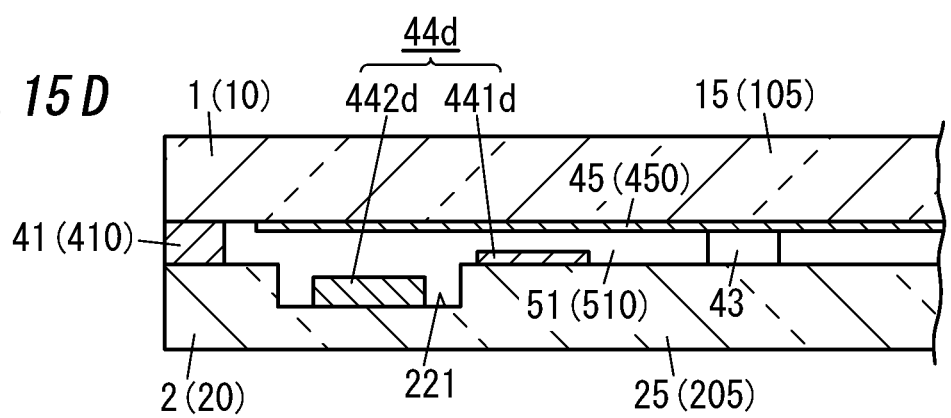

GLASS PANEL UNIT, BUILDING COMPONENT, AND METHOD FOR ACTIVATING GAS ADSORBENT

CROSS-REFERENCE OF RELATED APPLICATIONS

This application is the U.S. National Phase under 35 U.S.C. § 371 of International Patent Application No. PCT/JP2018/024124, filed on Jun. 26, 2018, which in turn claims the benefit of Japanese Application No. 2017-129886, filed on Jun. 30, 2017, the entire disclosures of which Applications are incorporated by reference herein.

TECHNICAL FIELD

The present disclosure relates to a glass panel unit, a building component, and a method for activating a gas adsorbent.

BACKGROUND ART

Glass panel units with excellent thermal insulation properties have been proposed in the known art. For example, the glass panel unit disclosed in Patent Literature 1 improves overall thermal insulation properties thereof by creating an evacuated, hermetically sealed space between a pair of panels. In this glass panel unit, a gas adsorbent with the ability to adsorb a gas is arranged to be exposed in the hermetically sealed space.

The gas adsorbent included in the known glass panel unit is made of a metal such as Zr. A metallic gas adsorbent of this type is able to chemically adsorb a gas such as $H_2O$, $N_2$, $O_2$, $H_2$, or $CO_2$ into its metallic surface. The metallic gas adsorbent, however, will hardly adsorb, by nature, a gas with a large molecular weight such as a hydrocarbon-based gas (e.g., $CH_4$) or ammonia gas ($NH_3$). Therefore, when placed in an environment where a hydrocarbon base gas or ammonia gas is often produced, a glass panel unit containing this type of gas adsorbent in its hermetically sealed space tends to have a decreased degree of vacuum in the hermetically sealed space.

CITATION LIST

Patent Literature

Patent Literature 1: JP 2001-180985 A

SUMMARY OF INVENTION

In view of the foregoing background, it is therefore an object of the present disclosure to provide a glass panel unit, a building component, and a method for activating a gas adsorbent, all of which are configured or designed to effectively reduce the chances of the degree of vacuum decreasing unintentionally in the hermetically sealed space.

A glass panel unit according to an aspect of the present disclosure includes: a first panel including a glass pane; a second panel including another glass pane and arranged to face the first panel; a sealing portion in a frame shape that hermetically bonds respective peripheral edges of the first panel and the second panel together so as to create an evacuated, hermetically sealed space between the first panel and the second panel; a plurality of pillars arranged in the hermetically sealed space to keep a gap distance between the first panel and the second panel; and a gas adsorbent placed in the hermetically sealed space.

The gas adsorbent contains: a non-metallic getter material having a porous structure with the ability to adsorb gas molecules; and a metallic getter material having a metallic surface with the ability to adsorb gas molecules.

A building component according to another aspect of the present disclosure includes: the glass panel unit described above; and a frame fitted onto peripheral edges of the glass panel unit.

A method for activating a gas adsorbent according to still another aspect of the present disclosure includes heating, inside the hermetically sealed space created in the glass panel unit, both of the non-metallic getter material and the metallic getter material that are contained in the gas adsorbent.

BRIEF DESCRIPTION OF DRAWINGS

FIG. 15A is a cross-sectional view illustrating a main part of a second variation of the glass panel unit;

FIG. 15B is a cross-sectional view illustrating a main part of a third variation of the glass panel unit;

FIG. 15C is a cross-sectional view illustrating a main part of a fourth variation of the glass panel unit;

FIG. 15D is a cross-sectional view illustrating a main part of a fifth variation of the glass panel unit;

DESCRIPTION OF EMBODIMENTS

Figure 1:
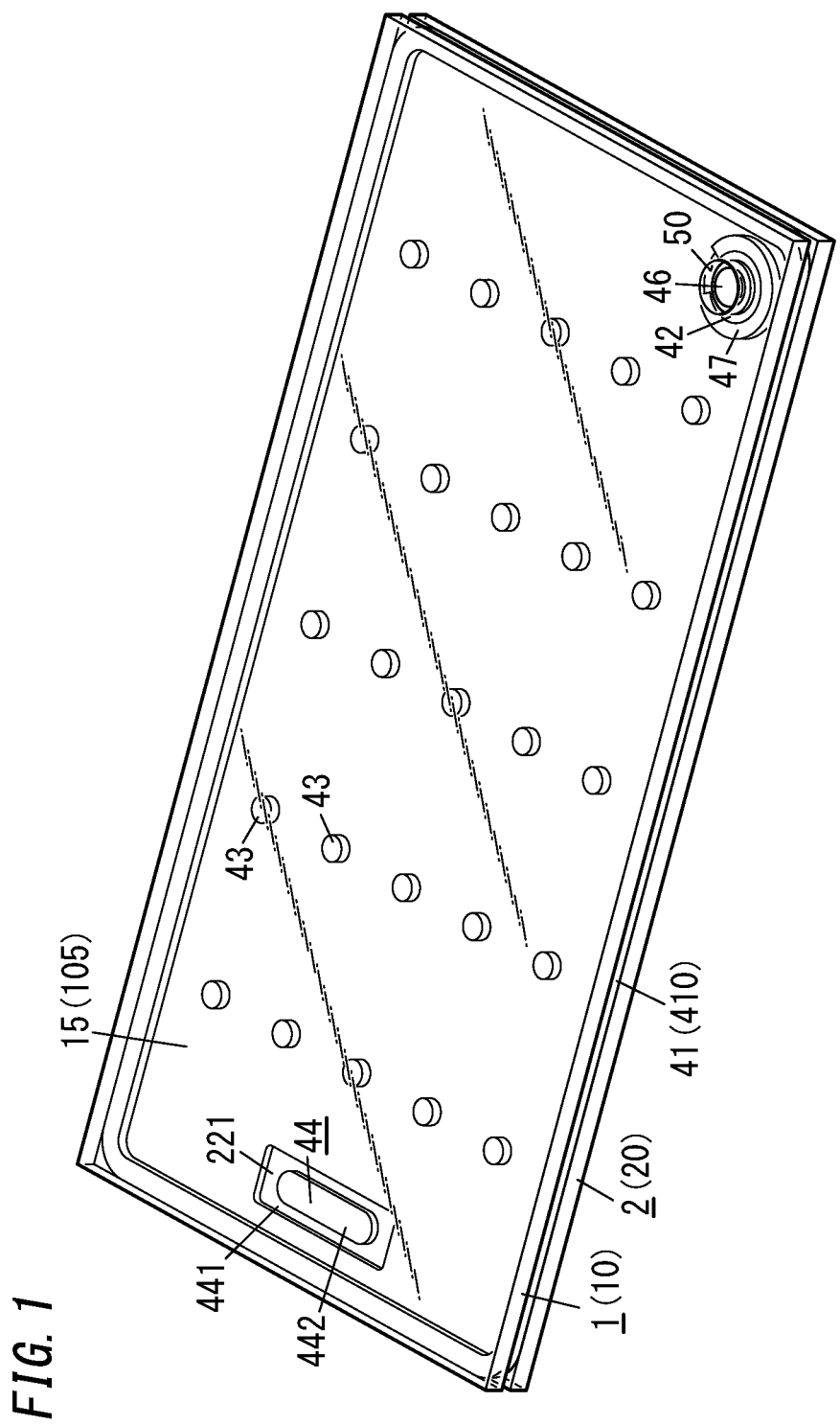
FIG. 1 is a perspective view illustrating a glass panel unit according to an exemplary embodiment.

[Glass Panel Unit]
(Exemplary Embodiment)

A glass panel unit according to an exemplary embodiment will be described with reference to the accompanying drawings. Note that on the drawings, respective constituent members of a glass panel unit according to the exemplary embodiment are depicted only schematically.

As shown in FIGS. 1-4, a glass panel unit according to this exemplary embodiment includes a first panel 1, a second panel 2, a sealing portion 41, a port sealing material 42, a plurality of pillars 43, and a gas adsorbent 44.

The first panel 1 and the second panel 2 are arranged to face each other with a narrow gap left between them. The first panel 1 and the second panel 2 are parallel to each other. Between the first panel 1 and the second panel 2, located are the sealing portion 41, the plurality of pillars 43, and the gas adsorbent 44.

The first panel 1 includes a glass pane 15 and a low-emissivity film 45 (see FIG. 3, for example) bonded onto the glass pane 15. The low-emissivity film 45 contains a metal such as silver with low emissivity, and has the capability of reducing the transfer of heat due to radiation. The second panel 2 includes a glass pane 25.

The glass pane 15 and the glass pane 25 may be configured as any of various types of glass panes made of soda lime glass, high strain point glass, chemically tempered glass, alkali-free glass, quartz glass, Neoceram, thermally tempered glass, or any other suitable glass.

Most of a counter surface 12, facing the second panel 2, of the first panel 1 is constituted of the surface of the low-emissivity film 45. A counter surface 22, facing the first panel 1, of the second panel 2 is constituted of the surface of the glass pane 25.

The sealing portion 41 is formed in a frame shape and may be made of a glass frit with a low melting point, for example. The sealing portion 41 is hermetically bonded to respective peripheral edges of the first and second panels 1 and 2. In other words, the respective peripheral edges of the first and second panels 1 and 2 are hermetically bonded together with the sealing portion 41.

The plurality of pillars 43 are dispersed so as to be spaced apart from each other. Each of the pillars 43 is arranged in contact with both of the respective counter surfaces 12 and 22 of the first and second panels 1 and 2.

The plurality of pillars 43 are arranged to be surrounded with the sealing portion 41 in the frame shape. The plurality of pillars 43 has the capability of keeping a predetermined gap distance between the first and second panels 1 and 2. The plurality of pillars 43 is suitably made of a resin such as polyimide either entirely or only partially.

Adopting a resin as a material for the respective pillars 43 achieves the advantage of reducing the thermal conduction of the respective pillars 43. In addition, when polyimide is used as a material for the respective pillars 43, excellent thermal resistance is achieved (i.e., allowing its shape to be easily maintained during the heating treatment process).

The gas adsorbent 44 includes a first gas adsorbent 441 containing a non-metallic getter material and a second gas adsorbent 442 containing a metallic getter material as an integrated structure. In other words, the gas adsorbent 44 is an integrated structure of the first gas adsorbent 441 and the second gas adsorbent 442.

The non-metallic getter material has a porous structure with the ability to adsorb gas molecules. Examples of the non-metallic getter materials include zeolite-based, active carbon, and magnesium oxide getter materials. The zeolite-based getter materials include an ion exchanged zeolite. Examples of ion exchange materials include K, $NH_4$, Ba, Sr, Na, Ca, Fe, Al, Mg, Li, H, and Cu.

The first gas adsorbent 441 contains the non-metallic getter material, and therefore, is able to effectively adsorb gas molecules of a hydrocarbon based gas (such as $CH_4$ or $C_2H_6$) or an ammonia gas ($NH_3$) that a metallic getter material does not adsorb easily.

In addition, the first gas adsorbent 441 contains the non-metallic getter material, and therefore, has the property of desorbing, when activated by heating, gas molecules that have adsorbed to the porous structure of the non-metallic getter material. As used herein, activating the first gas adsorbent 441 means activating the non-metallic getter material.

The metallic getter material has a metallic surface with the ability to chemically adsorb gas molecules. Examples of the metallic getter materials include a zirconium-based (such as Zr—Al or Zr—V—Fe) getter material and a titanium-based getter material.

The second gas adsorbent 442 contains the metallic getter material, and therefore, is able to adsorb molecules of a gas such as $H_2O$, $N_2$, $O_2$, $H_2$, or $CO_2$ more effectively than the non-metallic getter material does.

In addition, the second gas adsorbent 442 contains the metallic getter material, and therefore, has the property of diffusing, inside the metallic getter material, when activated by heating, gas molecules that have adsorbed (chemically adsorbed) to the metallic surface of the metallic getter material. As used herein, activating the second gas adsorbent 442 means activating the metallic getter material.

The counter surface 22 of the second panel 2 has a bottomed groove 221. The bottom of the groove 221 is provided lower by one step than the rest of the counter surface 22. The gas adsorbent 44 is arranged on the bottom (see FIG. 4, for example).

Specifically, the first gas adsorbent 441 is fixed on the bottom of the groove 221 and the second gas adsorbent 442 is fixed on the first gas adsorbent 441.

In the glass panel unit according to this exemplary embodiment, an evacuation port 50 is provided for the first panel 1, out of the two panels 1 and 2 (namely, the first and second panels 1 and 2). The evacuation port 50 is hermetically sealed with the port sealing material 42. The port sealing material 42 may be made of a glass frit, for example. The evacuation port 50 will be used to evacuate the internal space in a process step (i.e., an evacuating step to be described later) during the manufacturing process of the glass panel unit. The evacuation port 50 penetrates through the first panel 1.

The hermetically sealed space 51, surrounded with the first panel 1, the second panel 2, and the sealing portion 41, is sealed hermetically entirely by sealing up the evacuation port 50. The hermetically sealed space 51 may be a thermally insulated space, which has been evacuated to a degree of vacuum of 0.1 Pa or less, for example.

A plate 46 arranged inside the evacuation port 50 is a member that has been used in a process step (that is a sealing step to be described later) during the manufacturing process of the glass panel unit. Optionally, the evacuation port 50 may be further stuffed with a resin to cover the plate 46.

Next, a glass panel unit manufacturing method according to an exemplary embodiment will be described.

A glass panel unit manufacturing method according to the exemplary embodiment includes a providing step, a pillar arrangement step, a gas adsorbent placement step, a bonding step, an evacuating step, a sealing step, and an activating step.

Figure 5:
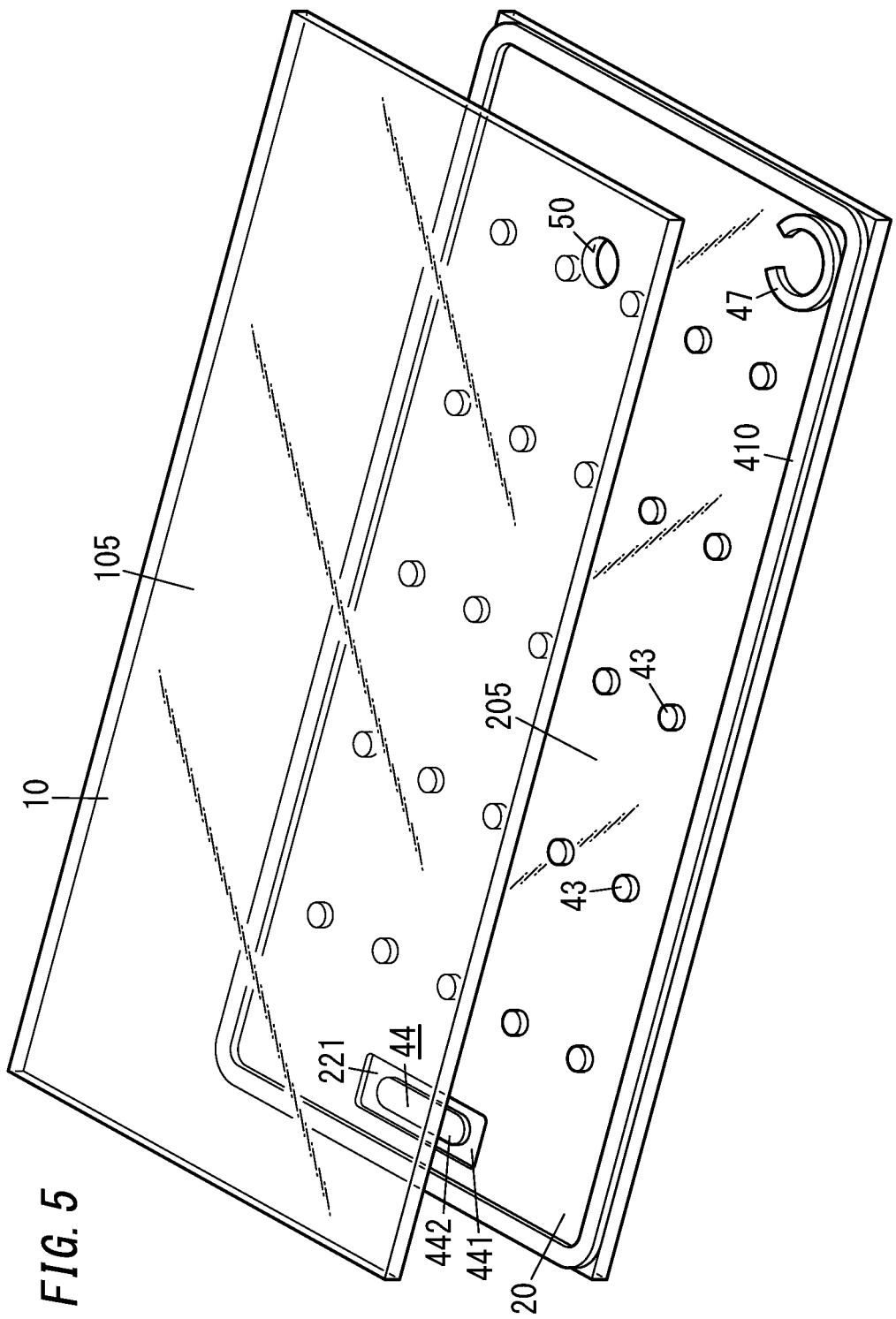
FIG. 5 is a perspective view illustrating a process step for manufacturing the glass panel unit.

The providing step includes providing a first substrate 10 and a second substrate 20 (see, for example, FIG. 5). The first substrate 10 will constitute the first panel 1 of the glass panel unit after going through the respective manufacturing process steps. The second substrate 20 will constitute the second panel 2 of the glass panel unit after going through the respective manufacturing process steps.

Figure 7:
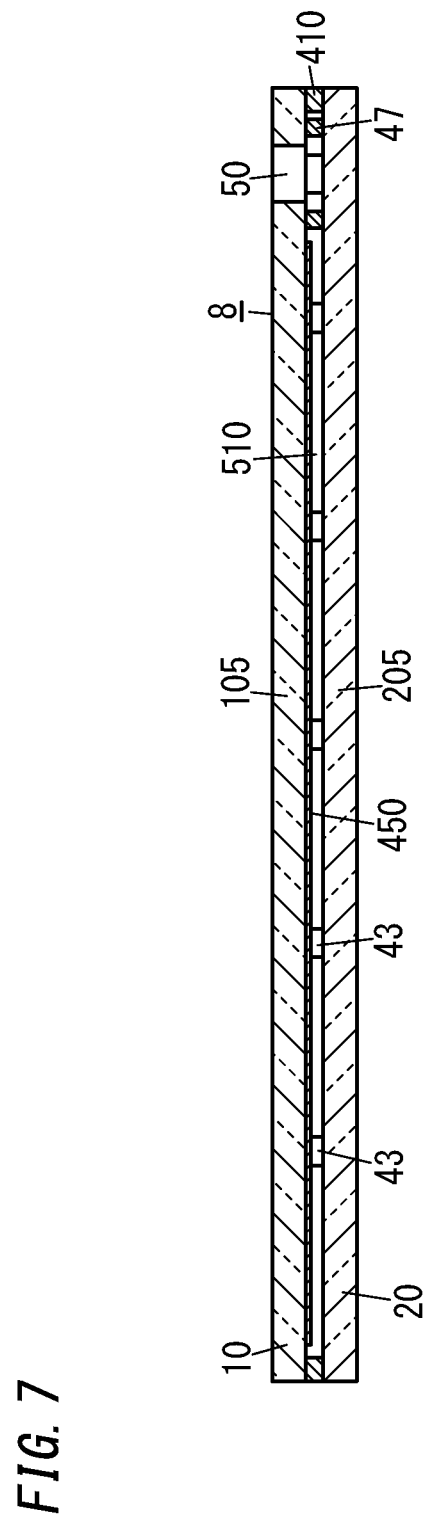
FIG. 7 is a cross-sectional view thereof taken along the plane C-C shown in FIG. 6.

The first substrate 10 includes a glass pane 105 and a low-emissivity film 450 bonded onto the glass pane 105 (see FIG. 7). The second substrate 20 includes a glass pane 205. A bottomed groove 221 is formed on one surface (upper surface) of the second substrate 20 (glass pane 205).

The glass pane 105 will constitute the glass pane 15 of the first panel 1 after going through the respective manufacturing process steps. The low-emissivity film 450 will constitute the low-emissivity film 45 of the first panel 1 after going through the respective manufacturing process steps, and the second glass pane 205 will constitute the glass pane 25 of the second panel 2 after going through the respective manufacturing process steps.

The pillar arrangement step includes arranging a plurality of pillars 43 on one surface (upper surface) of the second substrate 20 such that the pillars 43 are spaced apart from each other as shown in FIG. 5 and other drawings.

The gas adsorbent placement step includes placing the gas adsorbent 44 in the groove 221 of the second substrate 20.

Specifically, using an applicator such as a dispenser, the first gas adsorbent 441 in a paste form is applied onto the bottom of the groove 221. Next, the second gas adsorbent 442 in a solid form is placed and fixed on the first gas adsorbent 441 thus applied. However, this is only an exemplary way of placing the gas adsorbent 44. Alternatively, the gas adsorbent 44 may also be placed in any of various ways as will be described later about variations.

The pillar arrangement step and the gas adsorbent placement step do not have to be performed in this order but may also be performed in reverse order or even in parallel with each other.

The bonding step includes bonding the first substrate 10 and the second substrate 20 together with a sealing material 410 in a frame shape. Specifically, the first substrate 10 and the second substrate 20 that have been loaded into a furnace with the sealing material 410 and the plurality of pillars 43 interposed between them are heated in the furnace to a predetermined temperature higher than the melting point of the sealing material 410.

In the bonding step, bonding the sealing material 410 onto the first substrate 10 and the second substrate 20 creates an internal space 510 between the first and second substrates 10 and 20 and the sealing material 410. The plurality of pillars 43 and the gas adsorbent 44 are located in the internal space 510. The sealing material 410 will constitute the sealing portion 41 of the glass panel unit after going through the respective process steps.

The sealing material 410 is applied, using an appropriate applicator, in a frame shape onto an outer peripheral portion of one surface of the second substrate 20 (glass pane 205) (see FIG. 5). In addition, a material for a dam 47 is also applied, using an appropriate applicator, onto a predetermined region of the one surface of the second substrate 20. The dam 47 may be formed in the shape of an incomplete ring. For example, the dam 47 may be a C-ring. The sealing material 410 and the dam 47 are suitably made of the same material such as a glass frit.

The sealing material 410 and the dam 47 may be arranged before, after, or during the pillar arrangement step. In addition, the sealing material 410 and the dam 47 may be arranged before, after, or during the gas adsorbent placement step (i.e., the process step of placing the first gas adsorbent 441 and the second gas adsorbent 442 on the second substrate 20).

Figure 6:
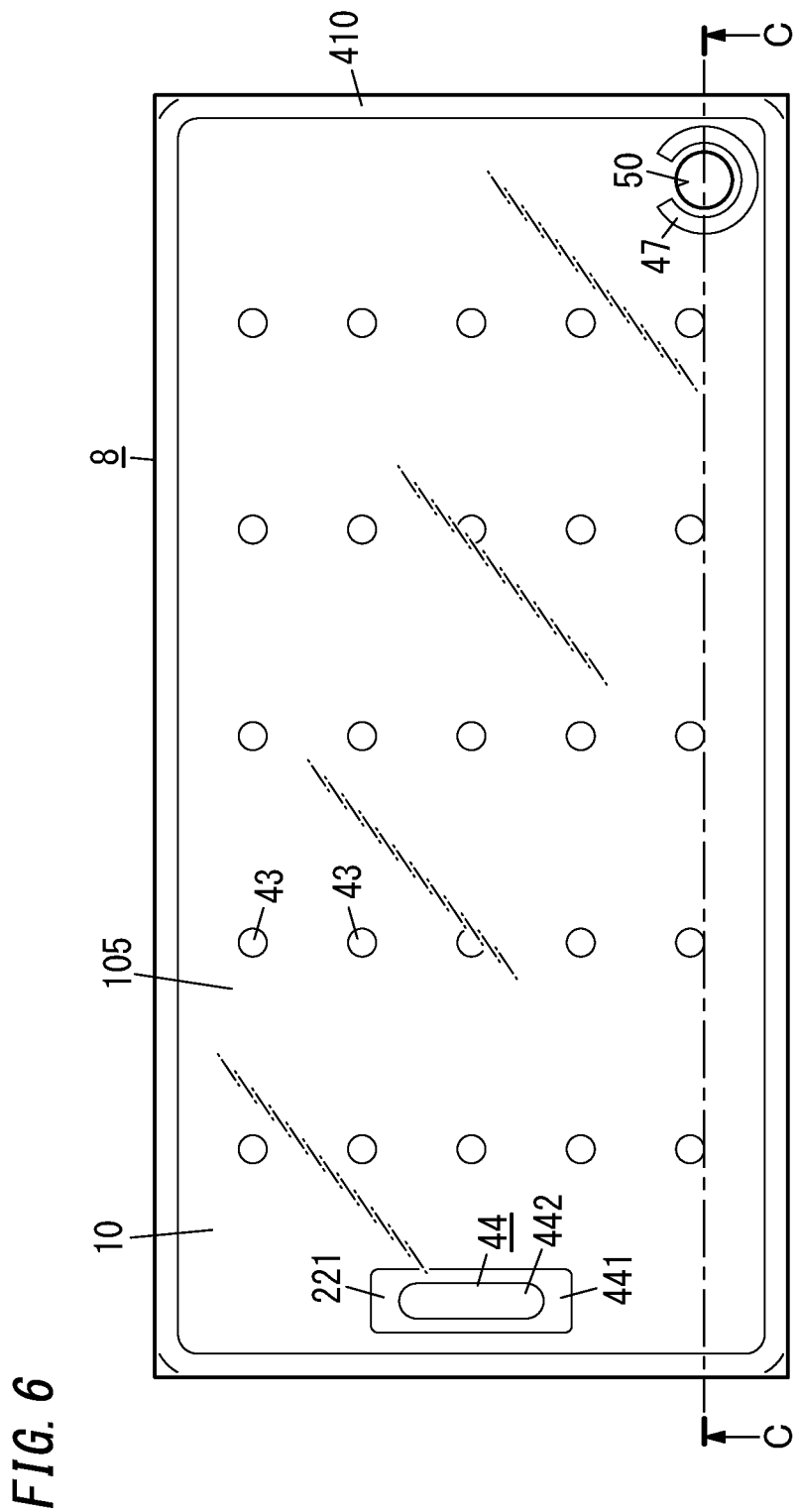
FIG. 6 is a plan view illustrating a work in progress of the glass panel unit.

A work in progress 8 such as the one shown in FIGS. 6 and 7 is obtained as a result of the process steps described above. The work in progress 8 is an intermediate product obtained during the manufacturing process of the glass panel unit.

This work in progress 8 is further subjected to the evacuating step, the sealing step, and the activating step.

Figure 8:
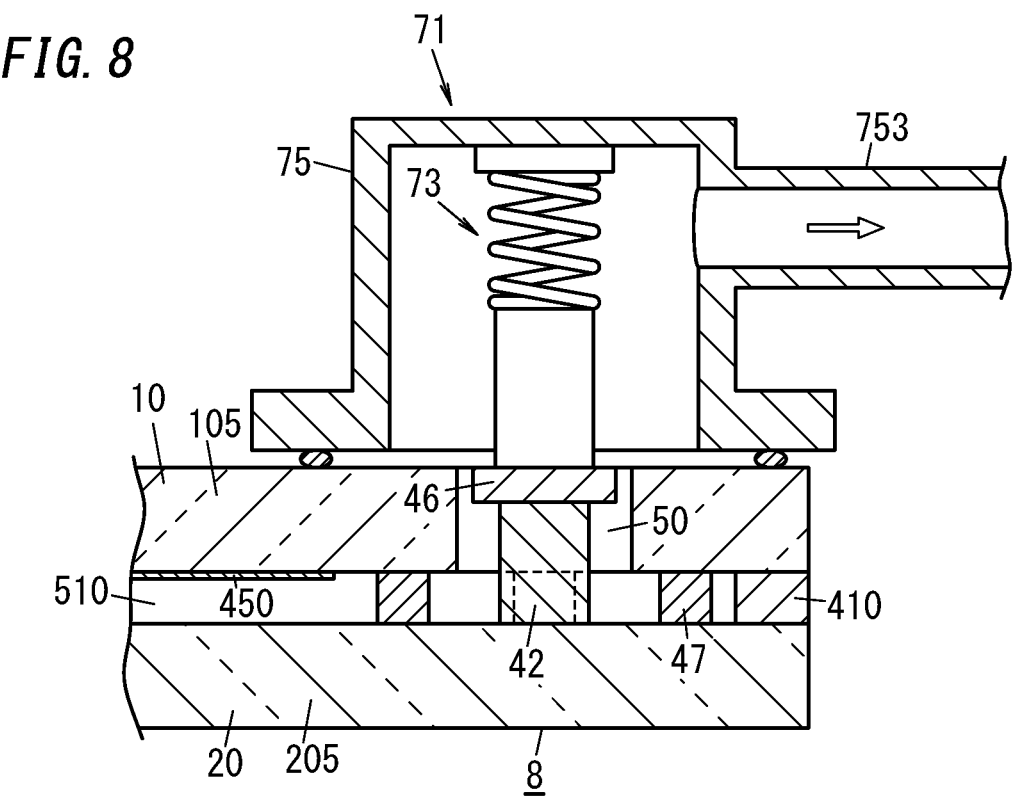
FIG. 8 is a partially cutaway side view of a main part illustrating how to evacuate an internal space of the work in progress.
Figure 9:
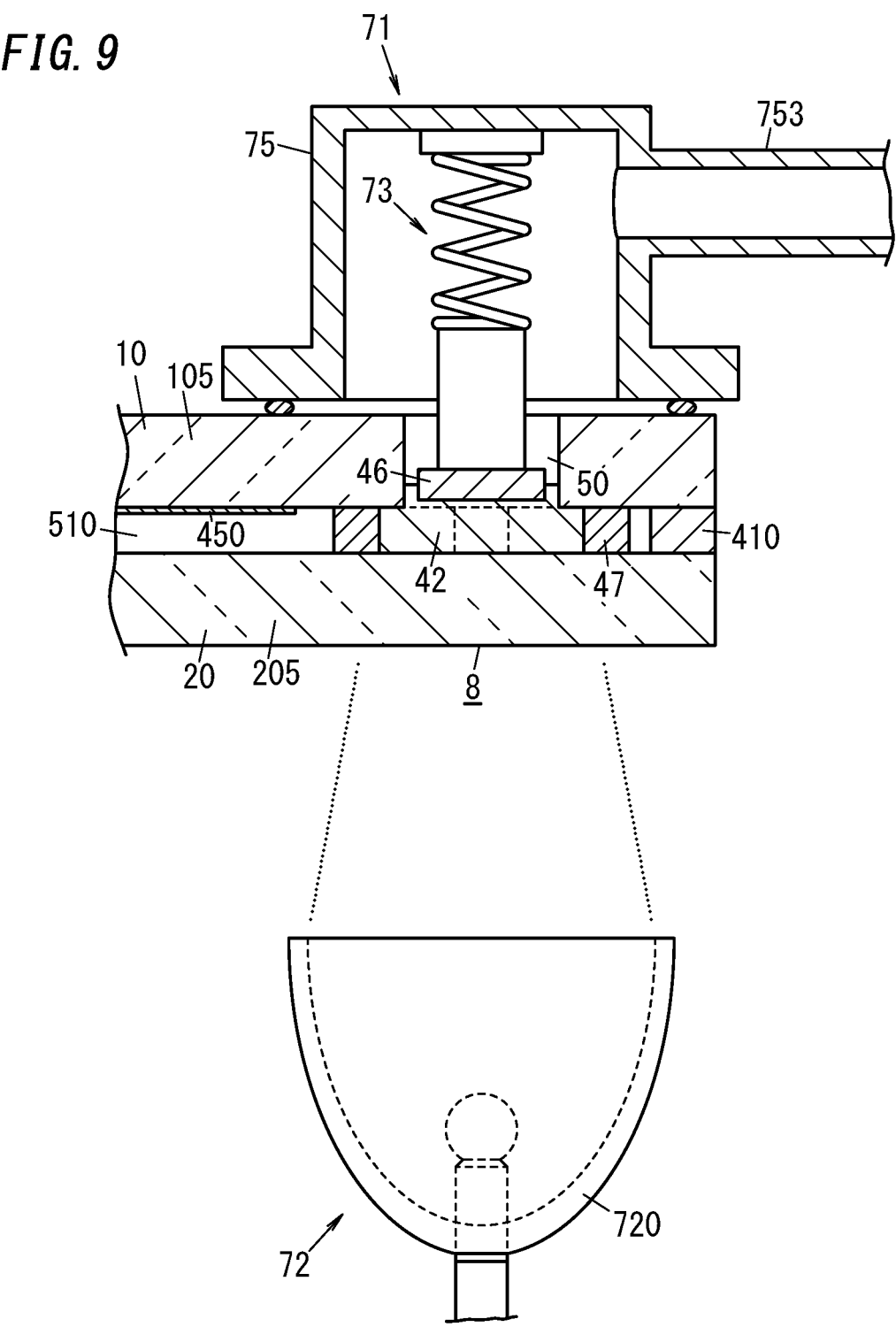
FIG. 9 is a partially cutaway side view of a main part illustrating how to seal the internal space of the work in progress.

The evacuating step and the sealing step are carried out using the system shown in FIGS. 8 and 9. This system includes an evacuating mechanism 71, a heating mechanism 72, and a pressing mechanism 73.

The evacuating mechanism 71 includes: an evacuation head 75 to be pressed against the work in progress 8; and a connection pipe 753 connected to the evacuation head 75. The evacuating mechanism 71 is configured to evacuate, through the evacuation port 50, the internal space 510 created in the work in progress 8 and keep the internal space 510 evacuated.

The heating mechanism 72 is arranged opposite from the evacuation head 75 with respect to the work in progress 8 (see FIG. 9). The heating mechanism 72 is configured to locally heat the port sealing material 42, inserted into the evacuation port 50, without making physical contact with the port sealing material 42.

The heating mechanism 72 includes an irradiator 720. The irradiator 720 is configured to irradiate the port sealing material 42, inserted into the evacuation port 50, with an infrared ray externally incident through the second substrate 20 (glass pane 205) and thereby heat the port sealing material 42. The infrared ray is suitably a near-infrared ray.

The pressing mechanism 73 is provided for the evacuation head 75. The pressing mechanism 73 is configured to press, in a state where the internal space 510 is evacuated by the evacuating mechanism 71, the port sealing material 42 inserted into the evacuation port 50 toward the second substrate 20.

In the evacuating step, the port sealing material 42 and a plate 46, both having a smaller diameter than the evacuation port 50, are inserted into the evacuation port 50 of the work in progress 8 (see FIG. 8). The port sealing material 42 is a solid sealing material made of a glass frit, for example. In this embodiment, the port sealing material 42 has a block shape. However, this is only an example and should not be construed as limiting. Alternatively, the port sealing material 42 may also have the shape of a cylinder with a vertically penetrating through hole. The plate 46 is located opposite from the second substrate 20 with respect to the port sealing material 42.

The evacuation head 75 is brought into airtight contact with a region, surrounding the opening formed by the evacuation port 50, of the first substrate 10. At this time, the port sealing material 42 and the plate 46 are pressed elastically toward the second substrate 20.

Exhausting the air in the evacuation head 75 in such a state through the connection pipe 753 (as indicated by the open arrow shown in FIG. 8) allows the internal space 510 to be evacuated through the evacuation port 50.

The sealing step includes sealing, using the heating mechanism 72 and the pressing mechanism 73, the internal space 510 while keeping the internal space 510 evacuated.

The sealing step includes softening the port sealing material 42 using the heating mechanism 72 and pressing the port sealing material 42 against the second substrate 20 with the biasing force applied by the pressing mechanism 73 toward the plate 46. The port sealing material 42 is deformed in the internal space 510 to the point of coming into contact with an inner peripheral surface of the dam 47. The cut of the dam 47 is closed and sealed up by the port sealing material 42 thus deformed.

This allows the evacuation port 50 to be sealed up with the port sealing material 42, thus hermetically sealing the internal space 510 while keeping the internal space 510 evacuated. This internal space 510 will constitute the hermetically sealed space 51 of the glass panel unit after going through the respective process steps.

Next, the activating step will be described.

Figure 10:
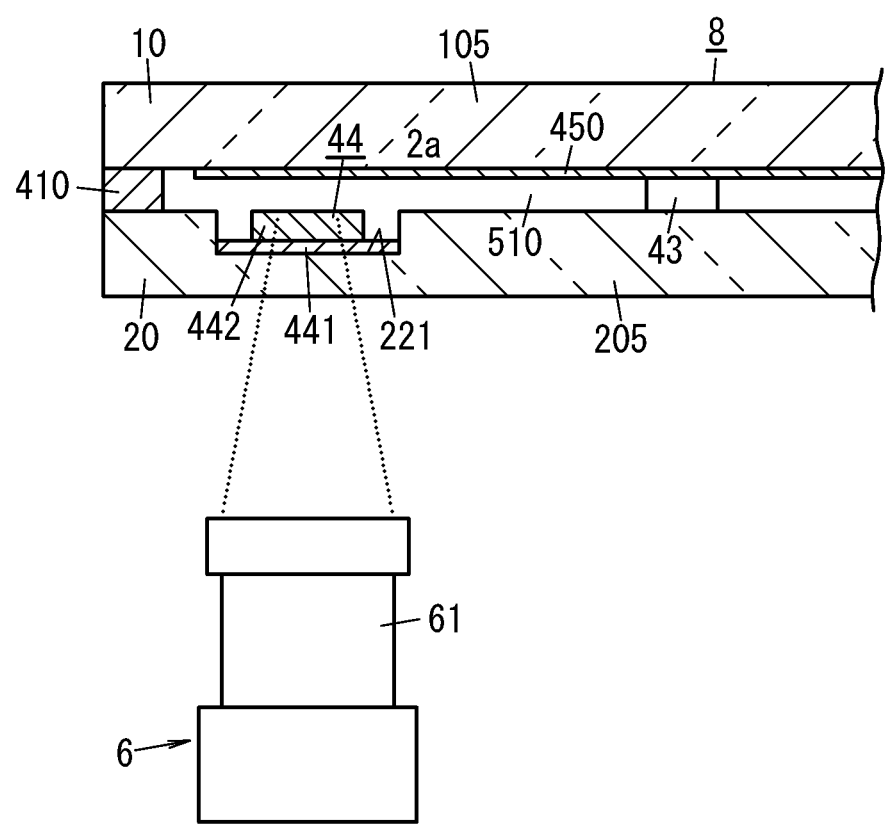
FIG. 10 is a partially cutaway side view of a main part illustrating how to activate a gas adsorbent placed in the internal space.

The activating step includes locally heating the gas adsorbent 44, placed in the internal space 510 of the work in progress 8, to a predetermined activation temperature using the local heating mechanism 6 shown in FIG. 10.

The activation temperature is a temperature higher than a predetermined temperature at which the sealing material 410 is melted in the bonding step, and is a temperature high enough to sufficiently activate the non-metallic getter material and metallic getter material contained in the gas adsorbent 44.

For example, the local heating mechanism 6 includes an irradiator 61 configured to emit a laser beam. The irradiator 61 is able to irradiate the gas adsorbent 44, placed in the internal space 510, with a laser beam externally incident through the second substrate 20 (glass pane 205). This allows the gas adsorbent 44 to be heated by a noncontact method.

The activating step is carried out in parallel with the evacuating step. That is to say, the gas adsorbent 44 is locally heated while the internal space 510 is being evacuated using the evacuation head 75.

The first gas adsorbent 441 contains the non-metallic getter material having a porous structure (such as zeolite subjected to Cu ion exchange). Thus, locally heating the gas adsorbent 44 causes molecules of the gas that has been adsorbed, such as a hydrocarbon based gas or an ammonia gas, to be desorbed from the first gas adsorbent 441, thus activating the first gas adsorbent 441. The gas molecules desorbed from the first gas adsorbent 441 are sucked by the evacuating mechanism 71 through the evacuation port 50.

The second gas adsorbent 442 contains the metallic getter material (such as a zirconium-based metallic getter material). Thus, locally heating the gas adsorbent 44 causes molecules of the gas that has been adsorbed into the second gas adsorbent 442 to be diffused inside the second gas adsorbent 442, thus activating the second gas adsorbent 442.

The sealing step will start to be performed when at least the first gas adsorbent 441 has been activated sufficiently through the activating step. The activating step may be performed in parallel with the sealing step. Alternatively, the activating step may be performed after the sealing step.

In the glass panel unit obtained through these manufacturing process steps, the first gas adsorbent 441 and second gas adsorbent 442 that have been activated are both located in the hermetically sealed space 51, thus allowing various types of gases in the hermetically sealed space 51 to be adsorbed and thereby reducing the chances of the degree of vacuum decreasing unintentionally in the hermetically sealed space 51. That is to say, this allows molecules of a gas such as the hydrocarbon-based gas or ammonia gas, which is not easily adsorbed into the second gas adsorbent 442, to be efficiently adsorbed into the first gas adsorbent 441 and also allows molecules of a gas such as $H_2O$, $N_2$, $O_2$, $H_2$, or $CO_2$ to be efficiently adsorbed into the second gas adsorbent 442.

Particularly when in the bonding step for manufacturing the glass panel unit, the temperature in the furnace is limited to 407° C., which is the ignition point of cotton, or less, organic substances such as fluff are often left in the hermetically sealed space 51 of the glass panel unit, thus increasing the chances of a hydrocarbon-based gas being produced from the residual organic substances. In addition, lowering the in-furnace temperature often causes the solvent of the sealing material 410 to be left partially without vaporizing fully, thus also increasing the chances of a hydrocarbon-based gas being produced.

Furthermore, a hydrocarbon-based gas is also produced easily from the resin contained in the respective pillars 43. If the resin is a material including nitrogen atoms (e.g., a resin material containing at least one of imide, imidazole, or oxazole), then an ammonia gas could be produced. Furthermore, if the material of the sealing portion 41 contains a resin, then a hydrocarbon-based gas or an ammonia gas could be produced from the sealing portion 41 as well. That is to say, in the glass panel unit according to this exemplary embodiment, portions containing a resin (such as the plurality of pillars 43 and the sealing portion 41) are exposed in the hermetically sealed space 51, and the hydrocarbon-based gas or ammonia gas could be produced from those portions as well.

In contrast, in the hermetically sealed space 51 of this glass panel unit, the first gas adsorbent 441 is placed, thus allowing the molecules of a gas such as the hydrocarbon-based gas or ammonia gas produced in the hermetically sealed space 51 after the manufacturing to be efficiency adsorbed into the first gas adsorbent 441. This effectively reduces the chances of the degree of vacuum decreasing unintentionally in the hermetically sealed space 51.

In addition, in the glass panel unit according to this exemplary embodiment, the first gas adsorbent 441 and the second gas adsorbent 442 are both placed in the hermetically sealed space 51. Thus, when heated inside the hermetically sealed space 51, the first gas adsorbent 441 and the second gas adsorbent 442 are both activated effectively for the following reasons.

Specifically, the molecules of the gas adsorbed into the first gas adsorbent 441 desorbs, when heated, from the first gas adsorbent 441. The molecules of the gas desorbed from the first gas adsorbent 441 are at least partially adsorbed into the second gas adsorbent 442 to be diffused, when heated, inside the second gas adsorbent 442. Thus, the glass panel unit according to this exemplary embodiment is able to effectively activate both of the first gas adsorbent 441 and the second gas adsorbent 442 by locally heating the first gas adsorbent 441 and the second gas adsorbent 442 in the hermetically sealed space 51.

(Variations)

The glass panel unit and manufacturing method thereof described above may be appropriately modified depending on a design choice or any other factor, as will be described below. In the following description of variations, any constituent element, having the same function as a counterpart of the exemplary embodiment described above, will be designated by the same reference numeral as that counterpart's, and a detailed description thereof will be omitted herein.

First of all, numerous variations of the glass panel unit manufacturing method will be described.

In the glass panel unit manufacturing method described above, the plurality of pillars 43 are arranged on the one surface of the second substrate 20 in the pillar arrangement step. However, the plurality of pillars 43 may be arranged on at least one of the first and second substrates 10 and 20. That is to say, the plurality of pillars 43 may be arranged on the first substrate 10 or may be distributed on the first substrate 10 and the second substrate 20.

Also, in the glass panel unit manufacturing method described above, the gas adsorbent 44 is placed on the one surface of the second substrate 20 in the gas adsorbent placement step. However, the gas adsorbent 44 may be placed on at least one of the first and second substrates 10 and 20. That is to say, the gas adsorbent 44 may be placed on the first substrate 10 or may be placed on both of the first substrate 10 and the second substrate 20. The number of the gas adsorbents 44 placed may be two or more.

In the glass panel unit manufacturing method described above, the gas adsorbent 44 is irradiated, in the activating step, with a laser beam through the second substrate 20. However, this is only an example and should not be construed as limiting. Rather, the gas adsorbent 44 may be irradiated with the laser beam through at least one of the first substrate 10 or the second substrate 20. Optionally, the gas adsorbent 44 may be locally heated by being irradiated with an infrared ray (suitably, a near-infrared ray). Alternatively, the gas adsorbent 44 may be locally heated by inductively heating the metallic getter material contained in the second gas adsorbent 442.

Also, in the glass panel unit manufacturing method described above, the gas adsorbent 44 is activated in the internal space 510. Alternatively, the gas adsorbent 44 that has already been subjected to the activating process and encapsulated in a package may be used. In that case, the package may be arranged in the internal space 510 and then broken. As a means for breaking the package in the internal space 510, the package may be joined to a member with a different thermal expansion coefficient from the package and may be broken with thermal stress produced in the package due to a variation in temperature during the manufacturing process.

Furthermore, in the glass panel unit manufacturing method described above, the internal space 510 is sealed up by closing the evacuation port 50 with the port sealing material 42 in the sealing step. However, this is only an example and should not be construed as limiting. Alternatively, the internal space 510 may be sealed up by any other means. For example, in the first variation of the glass panel unit shown in FIGS. 11-14, the internal space 510 is sealed up by utilizing the deformation of the sealing material 410 during the manufacturing process.

Figure 11:
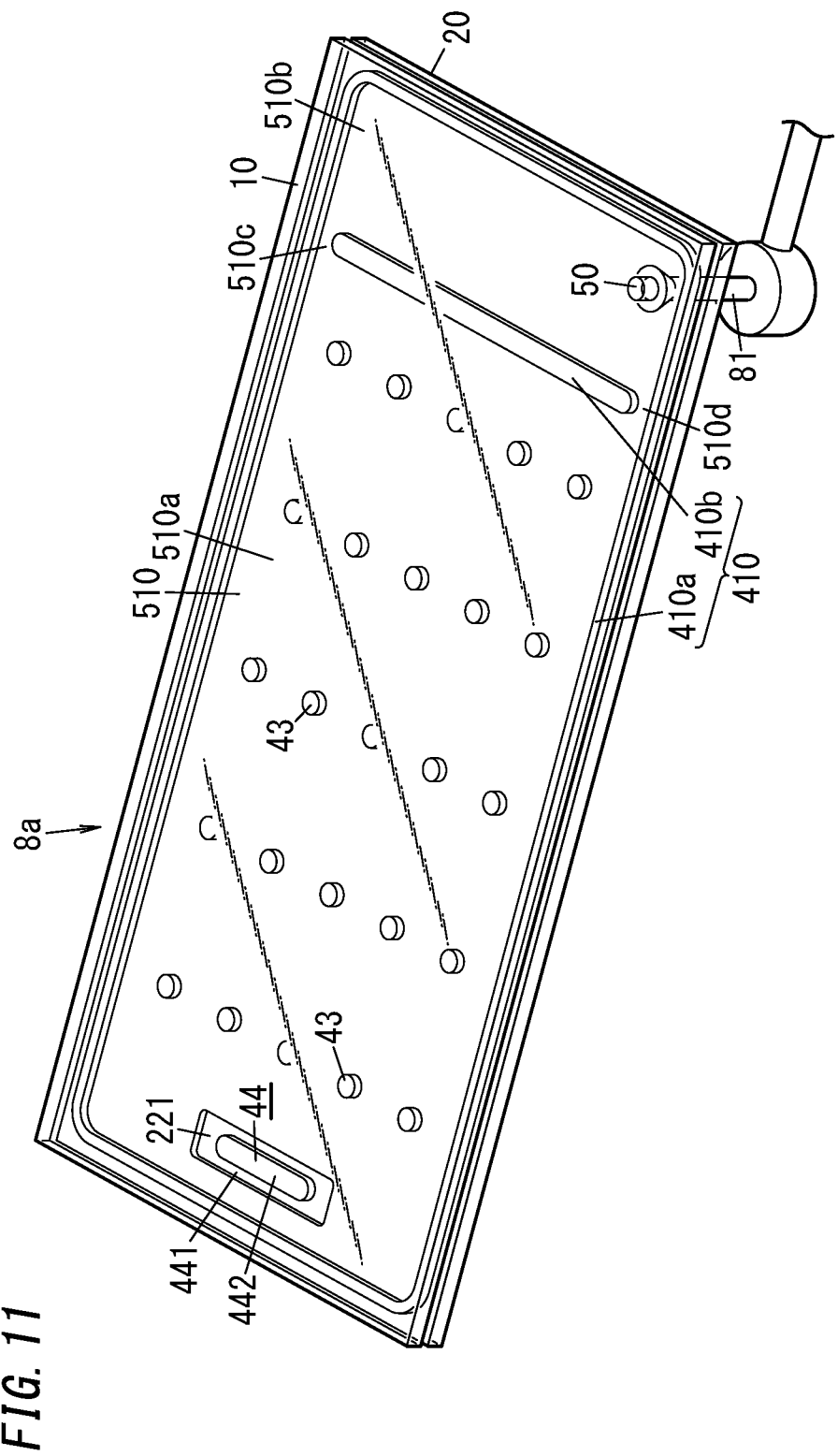
FIG. 11 is a perspective view illustrating a work in progress obtained by a manufacturing process according to a first variation of the glass panel unit.

As shown in FIG. 11, in the first variation, the sealing material 410 arranged on the second substrate 20 includes a frame 410a and a partition 410b. The partition 410b suitably has a higher melting point than the frame 410a. Alternatively, the partition 410b and the frame 410a may have the same melting point as well.

In the first variation, the sealing material 410 is suitably a material with a melting point of 300° C. or less. For example, a vanadium-based seal frit is suitably used as the sealing material 410. The partition 410b is formed in a straight line shape in a region surrounded with the frame 410a.

In the first variation, in the work in progress 8a formed through the bonding step, the internal space 510 is created between the first substrate 10, the second substrate 20, and the frame 410a. The partition 410b is located in the internal space 510. The partition 410b separates the internal space 510 into a first space 510a and a second space 510b. Nevertheless, neither end of the partition 410b is in contact with the frame 410a.

Also, in the first variation, the evacuation port 50 is cut through the second substrate 20 so as to communicate with the second space 510b out the two separated spaces of the internal space 510. The gas adsorbent 44 and the plurality of pillars 43 are arranged in the first space 510a out the two separated spaces of the internal space 510.

The internal space 510 of the work in progress 8a has two air passages 510c and 510d. Each of these two air passages 510c and 510d connects the first space 510a to the second space 510b. Each of the two air passages 510c and 510d is a gap left between the partition 410b and the frame 410a.

In the bonding step according to the first variation, the frame 410a once softens by being heated and then is cured to be hermetically bonded onto the first substrate 10 and the second substrate 20. In the bonding step, the partition 410b is hardly deformed.

Figure 12:
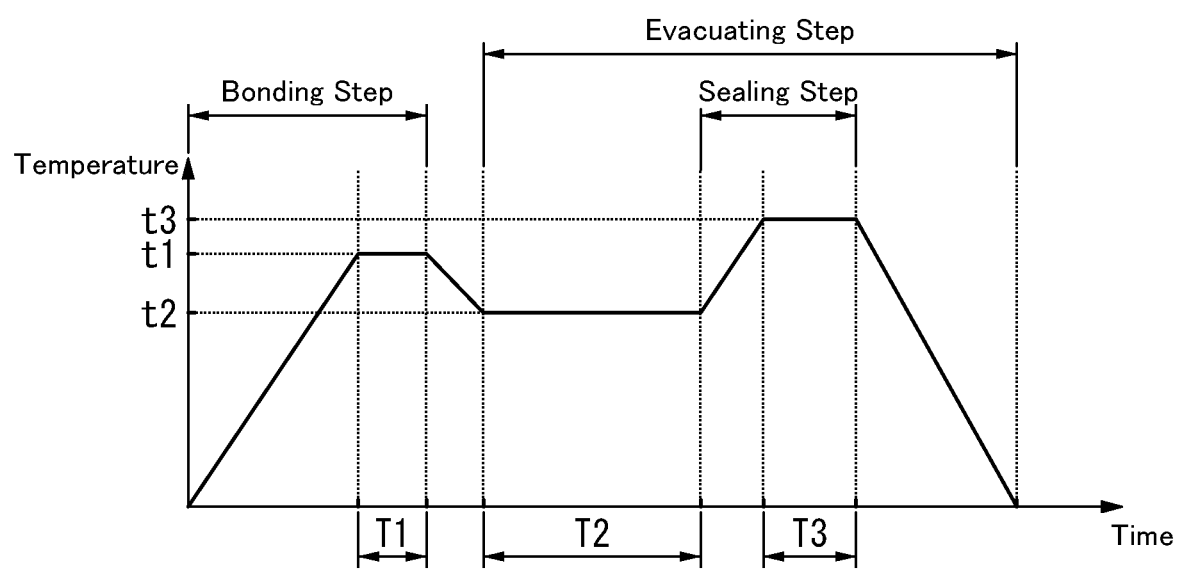
FIG. 12 is a graph showing how an in-furnace heating temperature changes with time according to the first variation.

FIG. 12 is a graph showing how the heating temperature (in-furnace temperature) changes with time. In the bonding step, heating at a first temperature t1 is conducted for a first predetermined amount of time T1.

The first temperature t1 is a temperature higher than the melting point of the frame 410a. The first temperature t1 may be 270° C., for example. The first predetermined amount of time T1 may be 15 minutes, for example.

In the evacuating step according to the first variation, the first space 510a is evacuated through the air passages 510c and 510d, the second space 510b, and the evacuation port 50 of the work in progress 8a. In this process step, the evacuation may be performed using a vacuum pump through an evacuation pipe 81 connected to the evacuation port 50, for example.

In the evacuating step, the work in progress 8a is heated at a second temperature t2 lower than the first temperature t1 (see FIG. 12) for a second predetermined amount of time T2. The second temperature t2 may be 250° C., for example. The second predetermined amount of time T2 may be 60 minutes, for example.

In the first variation, the activating step is performed in parallel with the evacuating step.

In the activating step, the gas adsorbent 44 (namely, the first gas adsorbent 441 and the second gas adsorbent 442) placed in the internal space 510 (more specifically, the first space 510a) of the work in progress 8a is irradiated with a laser beam, for example, and thereby locally heated to a predetermined activation temperature.

The activation temperature of the gas adsorbent 44 is sufficiently higher than the first temperature t1 at which the sealing material 410 is melted in the bonding step. In addition, the activation temperature of the gas adsorbent 44 is sufficiently higher than not only the second temperature t2 but also a third temperature t3 at which the work in progress 8a is heated in the sealing step (to be described later).

In the first variation, after the activating step has been performed, the sealing step is performed. The sealing step is performed in parallel with the evacuating step.

In the sealing step, while the internal space 510 is being evacuated, the partition 410b is melted by being heated, thus closing the air passages 510c and 510d with the partition 410b deformed. At a point in time when the sealing step is finished, there are no air passages 510c, 510d in the internal space 510 (see FIG. 13).

When the sealing step is finished, the first space 510a and the second space 510b are hermetically separated from each other by the partition 410b deformed. As used herein, "seal the internal space" may refer to a situation where the internal space 510 is sealed only partially (i.e., only the first space 510a is sealed) as in the first variation.

As shown in FIG. 12, in the sealing step, the work in progress 8a is heated at the third temperature t3 for a third predetermined amount of time T3. The third temperature t3 is higher than the first temperature t1, the second temperature t2, and the melting point of the partition 410b. The third temperature t3 may be 300° C., for example. The third predetermined amount of time T3 may be 30 minutes, for example.

Figure 13:
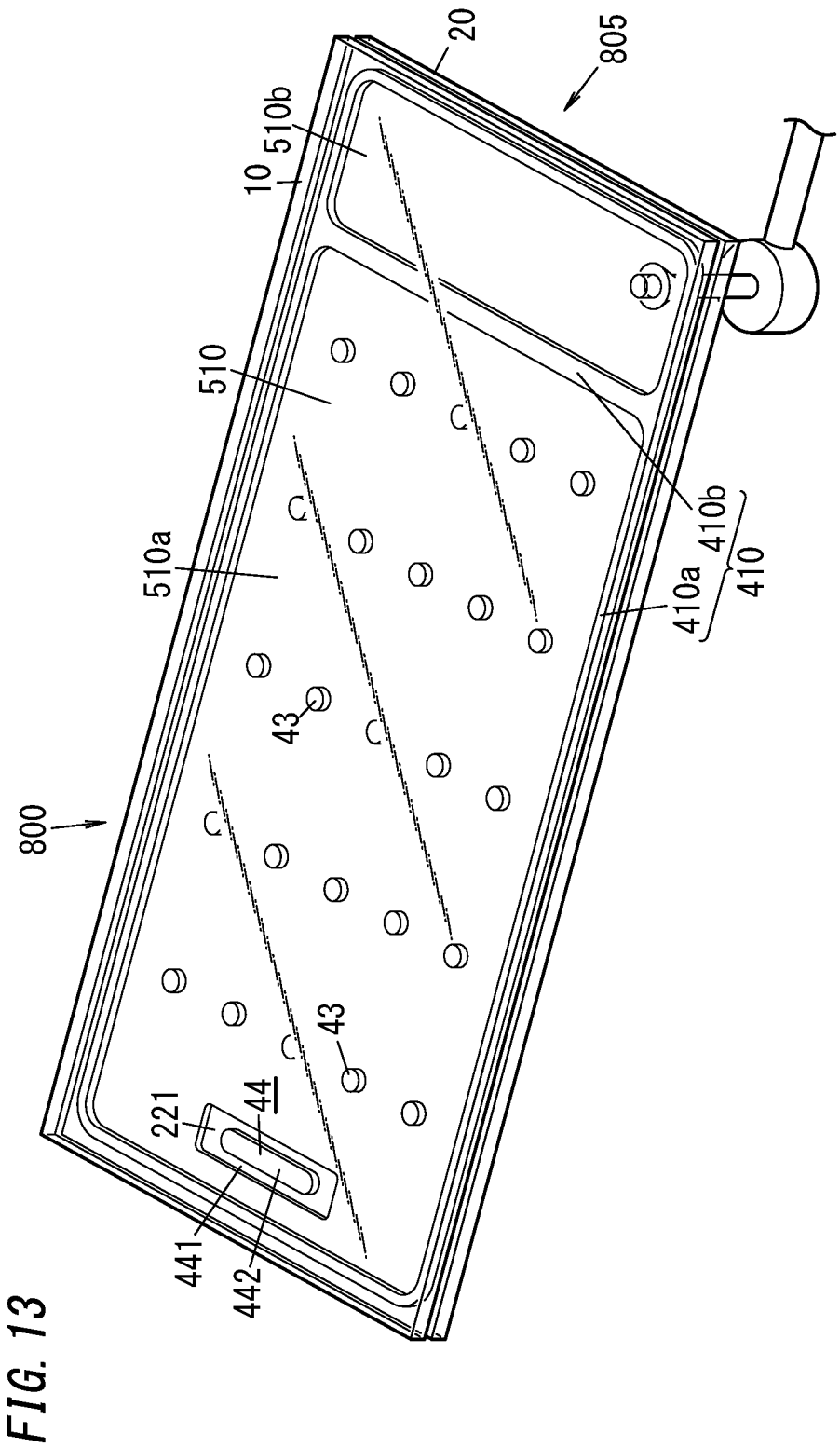
FIG. 13 is a perspective view illustrating a glass composite obtained by the manufacturing process according to the first variation.

In the first variation, the glass composite 800 shown in FIG. 13 is obtained by going through the respective process steps described above. Removing a portion 805 including the second space 510b and the evacuation port 50 from the glass composite 800 completes a glass panel unit with the evacuated first space 510a.

Figure 14:
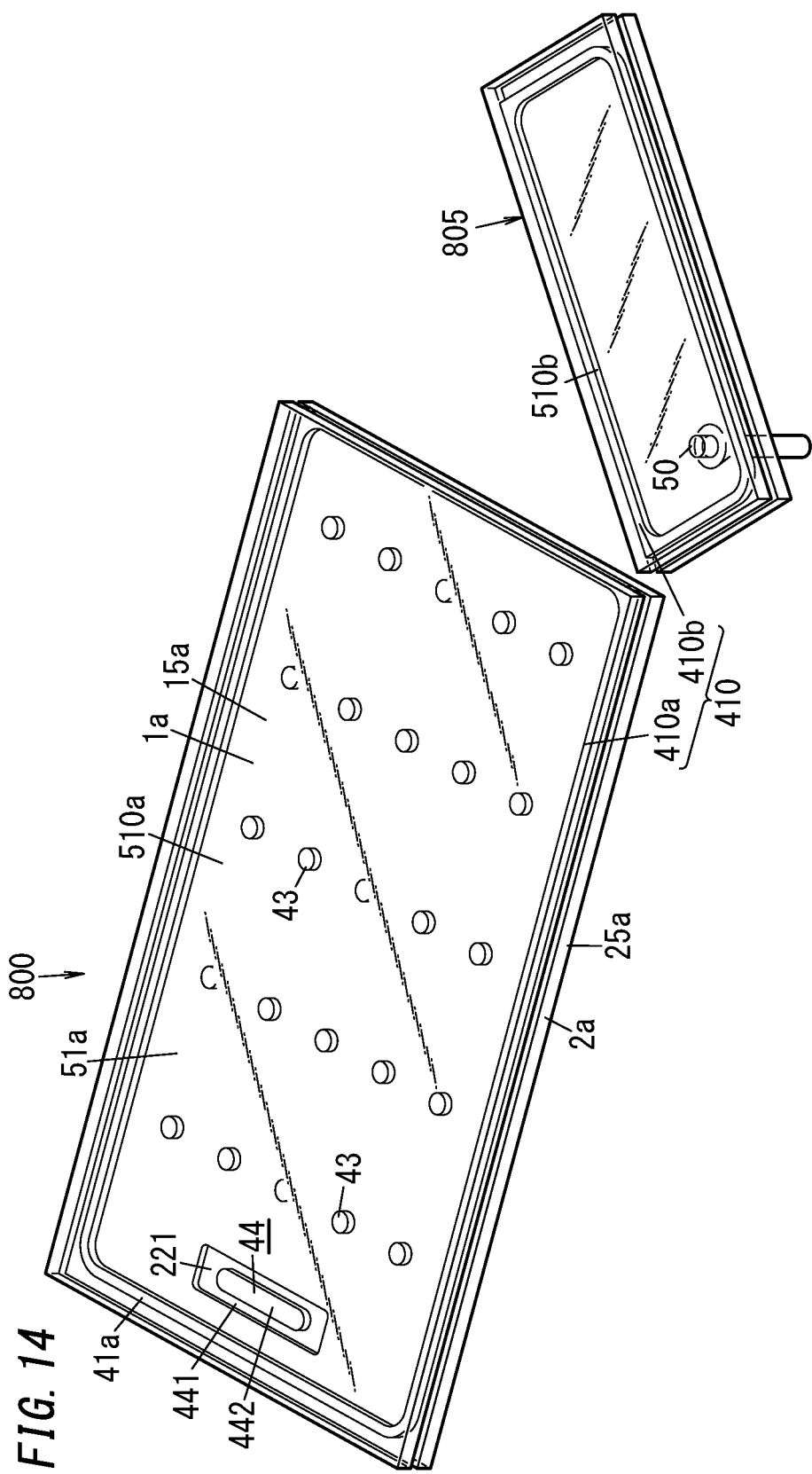
FIG. 14 is a perspective view illustrating how to cut off the glass composite.

As shown in FIG. 14, in the step of removing the portion 805 (i.e., in the removing step), the glass composite 800 is cut off along the partition 410b. Alternatively, the glass composite 800 may also be cut off along a line passing through the second space 510b.

In the first variation, part, not included in the portion 805, of the first substrate 10 constitutes a first panel 1a of the glass panel unit. The first panel 1a includes a glass pane 15a. Likewise, part, not included in the portion 805, of the second substrate 20 constitutes a second panel 2a of the glass panel unit. The second panel 2a includes a glass pane 25a.

Likewise, part, not included in the portion 805, of the sealing material 410 (including the frame 410a and the partition 410b) constitutes a sealing portion 41a of the glass panel unit. The first space 510a constitutes a hermetically sealed space 51a of the glass panel unit.

In the first variation, the first gas adsorbent 441 and the second gas adsorbent 442 are both activated in the furnace. However, these gas adsorbents 441 and 442 are not necessarily activated at this timing.

For example, the first gas adsorbent 441 and the second gas adsorbent 442 may be both activated by being locally heated outside the furnace after the glass composite 800 has been formed by performing the bonding, evacuating, and sealing steps inside the furnace.

Alternatively, after the glass composite 800 has been formed by activating the first gas adsorbent 441 while performing the evacuating step inside the furnace, the second gas adsorbent 442 may be activated outside the furnace. In that case, the first gas adsorbent 441 is activated according to the heating temperature inside the furnace and the second gas adsorbent 442 is activated by being locally heated outside the furnace.

Still alternatively, after the glass composite 800 has been formed by activating the first gas adsorbent 441 only to a certain degree while performing the evacuating step inside the furnace, the first gas adsorbent 441 may be further activated and the second gas adsorbent 442 may be activated outside the furnace. In that case, the first gas adsorbent 441 is activated to a certain degree according to the heating temperature inside the furnace and the first gas adsorbent 441 and the second gas adsorbent 442 are locally heated outside the furnace.

At any of the activation timings described above, the local heating outside the furnace may be performed by either irradiating the gas adsorbents with a laser beam or an infrared ray or inductively heating the metallic getter material contained in the second gas adsorbent 442.

Next, second through eleventh variations of the glass panel unit will be described.

FIGS. 15A-15D illustrate four types of gas adsorbents 44a, 44b, 44c, and 44d, which are different from the gas adsorbent 44 described above.

Specifically, in the second variation shown in FIG. 15A, the gas adsorbent 44a is formed as an integrated structure of a first gas adsorbent 441a and a second gas adsorbent 442a. In the arrangement step, this integrated structure is fixed on the bottom of the groove 221.

The gas adsorbent 44a may be formed by applying the first gas adsorbent 441a in a paste form onto the second gas adsorbent 442a in a block shape. In the second variation, the second gas adsorbent 442a, out of the first and second gas adsorbents 441a and 442a of the gas adsorbent 44a, is fixed on the second substrate 20. Alternatively, the first gas adsorbent 441a may be fixed on the second substrate 20 instead.

In the third variation illustrated in FIG. 15B, a gas adsorbent 44b is formed as an integrated structure of a first gas adsorbent 441b, a second gas adsorbent 442b, and a sheet of metal 443. In the arrangement step, this integrated structure is fixed on the bottom of the groove 221. In the third variation, the sheet of metal 443, out of the three constituent members of the gas adsorbent 44b, is fixed on the second substrate 20.

This gas adsorbent 44b may be formed in the following manner. First, an integrated structure of the second gas adsorbent 442b and the first gas adsorbent 441b may be formed by applying the first gas adsorbent 441b in a paste form onto the second gas adsorbent 442b in a block shape. Next, the integrated structure is fixed onto the sheet of metal 443 to obtain the gas adsorbent 44b. According to the third variation, the second gas adsorbent 442b, out of integrated structure, is fixed on the sheet of metal 443. Alternatively, the first gas adsorbent 441b of the integrated structure may be fixed on the sheet of metal 443 instead.

If the gas adsorbent 44b includes the sheet of metal 443, then the sheet of metal 443 may be inductively heated in the activating step such that the first gas adsorbent 441b and the second gas adsorbent 442b are locally heated through the sheet of metal 443.

In the fourth variation shown in FIG. 15C, a gas adsorbent 44c has a structure in which a second gas adsorbent 442c is covered with a first gas adsorbent 441c. In the fourth variation, the surface of the first gas adsorbent 441c of the gas adsorbent 44c is fixed on the bottom of the groove 221.

The gas adsorbent 44c may be formed by immersing the second gas adsorbent 442c in the block shape in a solution containing a powder of a non-metallic getter material such that a layer of the first gas adsorbent 441c is formed so as to cover the second gas adsorbent 442c.

In the fifth variation shown in FIG. 15D, a first gas adsorbent 441d and a second gas adsorbent 442d are provided separately from each other and fixed at mutually different regions of the second panel 2. The first gas adsorbent 441d and the second gas adsorbent 442d are spaced apart from each other. In the fifth variation, the second gas adsorbent 442d in a block shape is fixed on the bottom of the groove 221, and the first gas adsorbent 441d is fixed at another location, different from the groove 221, of the second substrate 20. However, this arrangement of the first gas adsorbent 441d and the second gas adsorbent 442d is only an example and should not be construed as limiting.

Also, in the glass panel units described above, the groove 221 is cut on the second panel 2. However, the groove 221 is not an essential constituent element as will be described below for the sixth through tenth variations.

Figure 16:
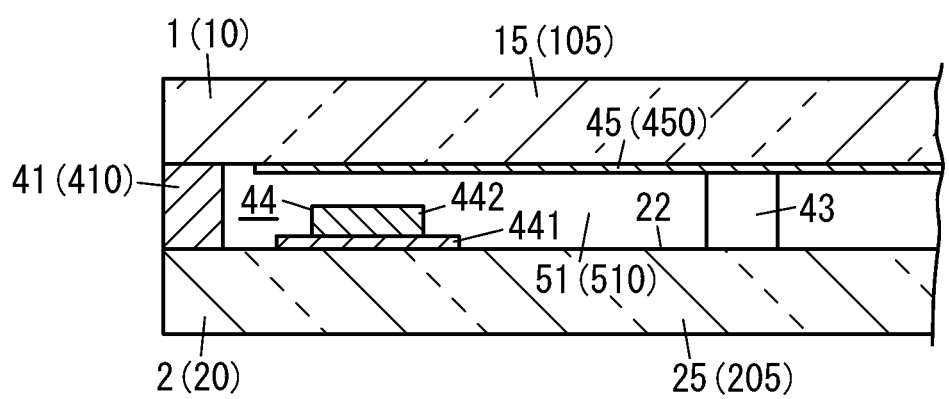
FIG. 16 is a cross-sectional view illustrating a main part of a sixth variation of the glass panel unit.

In the sixth variation shown in FIG. 16, the same gas adsorbent 44 as the one described for the exemplary embodiment is fixed on a flat region of the counter surface 22 of the second panel 2. That is to say, in the sixth variation, a first gas adsorbent 441 in a paste form is applied onto the flat region of the counter surface 22 of the second panel 2, and a second gas adsorbent 442 in a solid form is arranged on the first gas adsorbent 441 thus applied.

Figure 17A:
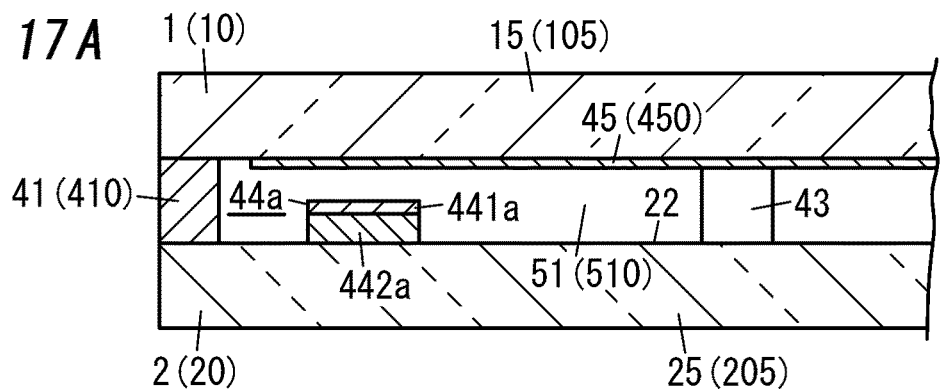
FIG. 17A is a cross-sectional view illustrating a main part of a seventh variation of the glass panel unit.

In the seventh variation shown in FIG. 17A, the same gas adsorbent 44a as the one described for the second variation is fixed on a flat region of the counter surface 22 of the second panel 2. In the seventh variation, the second gas adsorbent 442a, out of the first and second gas adsorbents 441a and 442a of the gas adsorbent 44a, is fixed on the second substrate 20. Alternatively, the first gas adsorbent 441a may be fixed on the second substrate 20 instead.

Figure 17B:
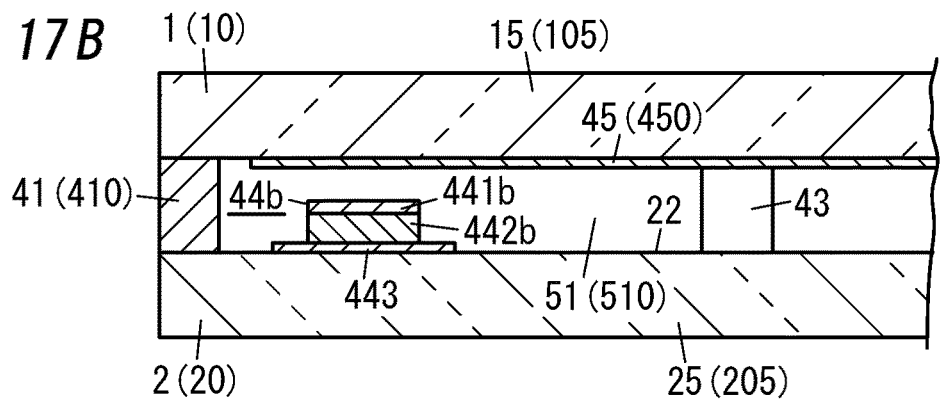
FIG. 17B is a cross-sectional view illustrating a main part of an eighth variation of the glass panel unit.

In the eighth variation shown in FIG. 17B, the same gas adsorbent 44b as the one described for the third variation is fixed on a flat region of the counter surface 22 of the second panel 2. In the eighth variation, the second gas adsorbent 442b, out of the first and second gas adsorbents 441b and 442b of the gas adsorbent 44b, is fixed on the sheet of metal 443. Alternatively, the first gas adsorbent 441b, out of the first and second gas adsorbents 441b and 442b of the gas adsorbent 44b, may be fixed on the sheet of metal 443 instead.

Figure 17C:
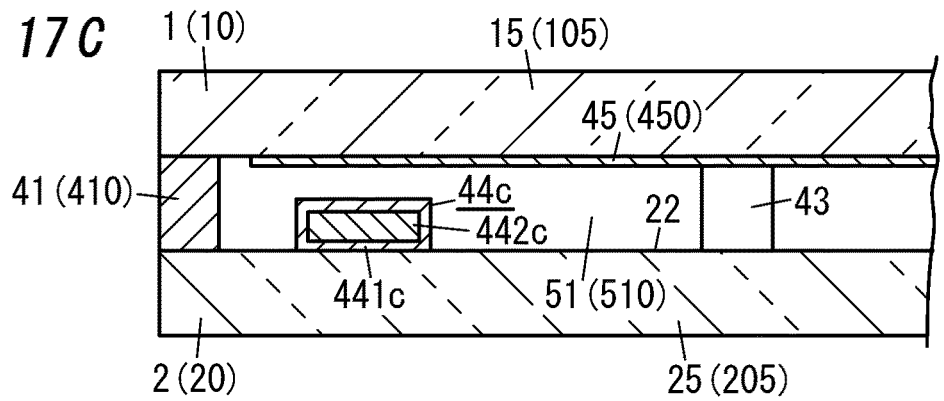
FIG. 17C is a cross-sectional view illustrating a main part of a ninth variation of the glass panel unit.

In the ninth variation shown in FIG. 17C, the same gas adsorbent 44c as the one described for the fourth variation is fixed on a flat region of the counter surface 22 of the second panel 2.

Figure 17D:
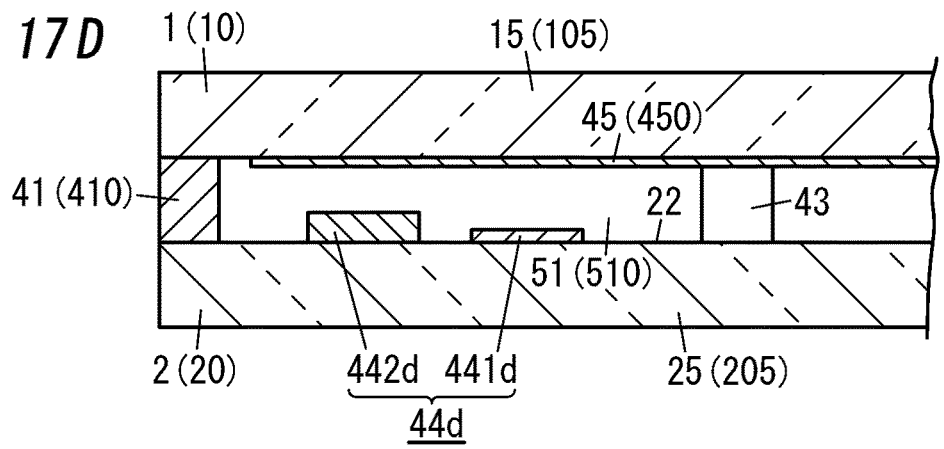
FIG. 17D is a cross-sectional view illustrating a main part of a tenth variation of the glass panel unit.

In the tenth variation shown in FIG. 17D, the same first gas adsorbent 441d and second gas adsorbent 442d as the ones described for the fifth variation are fixed separately onto two different flat regions of the counter surface 22 of the second panel 2.

Figure 18:
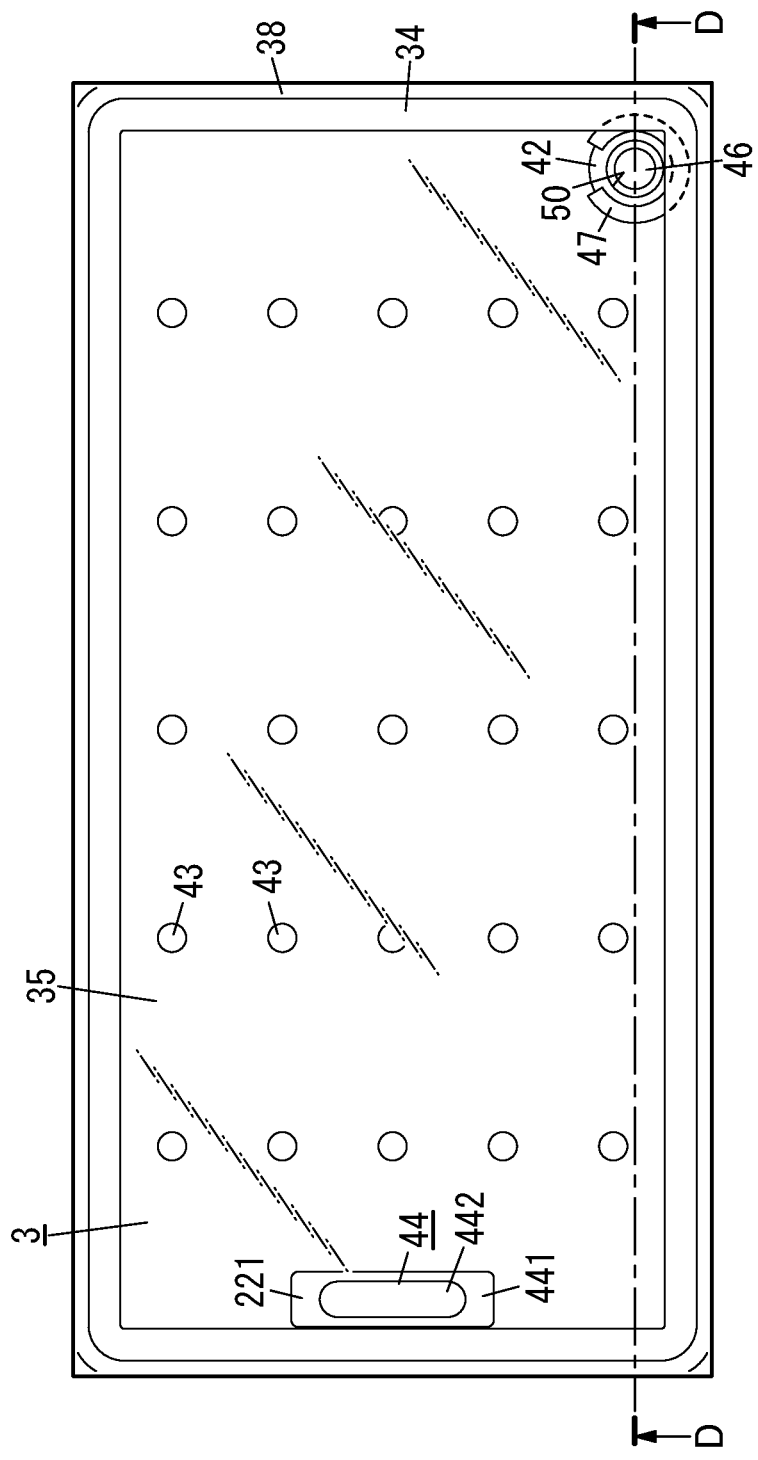
FIG. 18 is a plan view illustrating an eleventh variation of the glass panel unit.
Figure 19:
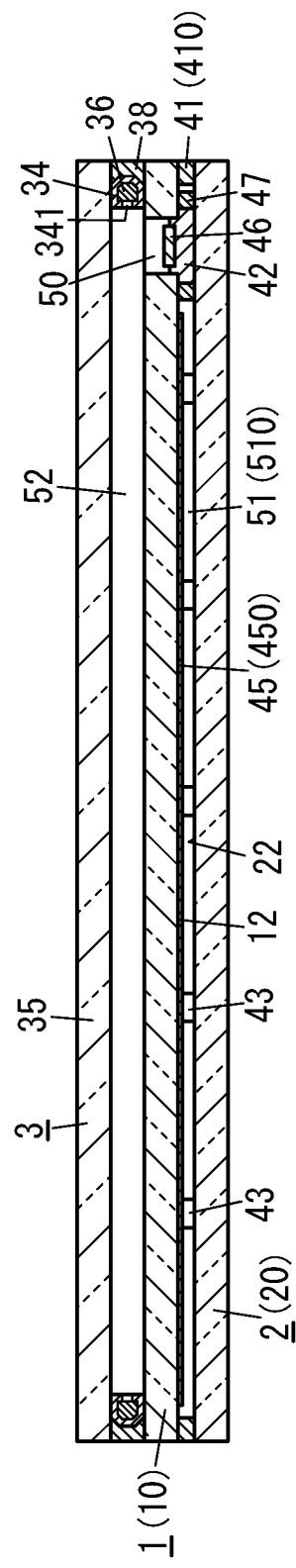
FIG. 19 is a cross-sectional view thereof taken along the plane D-D shown in FIG. 18.

Next, an eleventh variation of the glass panel unit will be described with reference to FIGS. 18 and 19.

Figure 2:
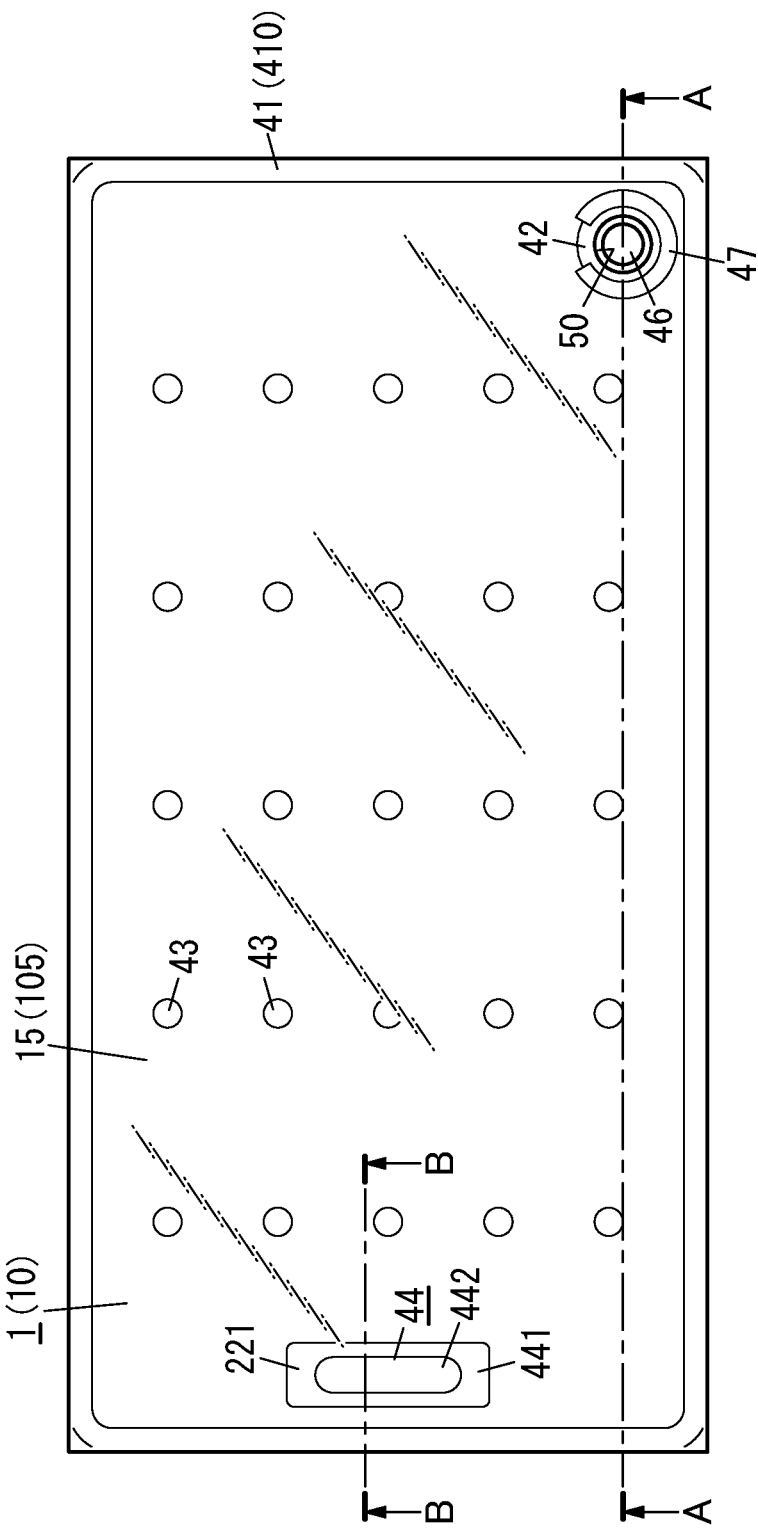
FIG. 2 is a plan view of the glass panel unit.
Figure 3:
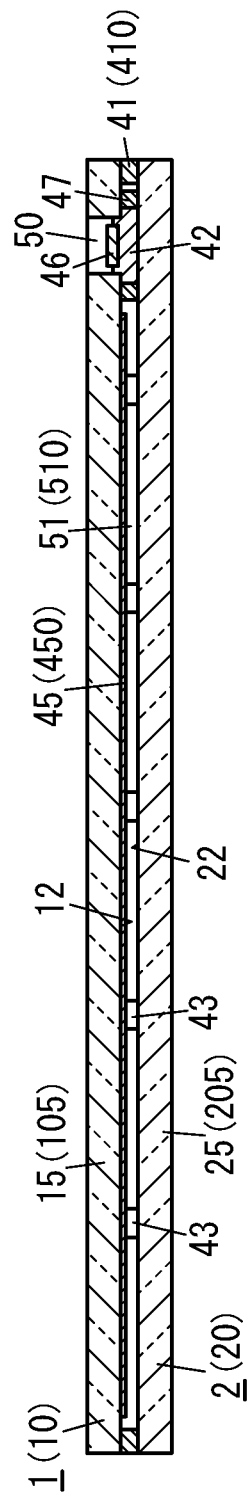
FIG. 3 is a cross-sectional view thereof taken along the plane A-A shown in FIG. 2.
Figure 4:
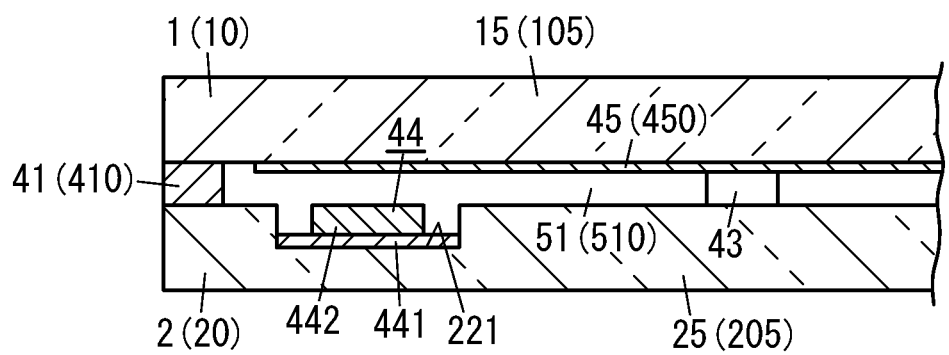
FIG. 4 is a cross-sectional view thereof taken along the plane B-B shown in FIG. 2.

The eleventh variation of the glass panel unit includes not only the first panel 1 and second panel 2 of the glass panel unit shown in FIGS. 1-3 but also a third panel 3 as well.

In the eleventh variation, the third panel 3 is laid on top of the first panel 1, and a hermetically sealed space 52 is created between the first panel 1 and the third panel 3. Note that this arrangement of the third panel 3 is only an example. Alternatively, the third panel 3 may be laid on top of the second panel 2, and a hermetically sealed space may be created between the second panel 2 and the third panel 3.

The third panel 3 includes at least a glass pane 35. Optionally, the third panel 3 may have an appropriate coating.

Between the respective peripheral edges of the third panel 3 and first panel 1, interposed are a frame-shaped spacer 34 with a hollow portion and a second sealing portion 38 formed in the shape of a frame covering the outer surfaces of the spacer 34. The hollow portion of the spacer 34 is filled with a desiccant 36. The space 52 is entirely surrounded with the second sealing portion 38 and the spacer 34.

The spacer 34 is made of a metal such as aluminum and has vent holes 341 cut through an inner peripheral portions thereof. The hollow portion of the spacer 34 communicates with the space 52 through the vent holes 341. The desiccant 36 may be a silica gel, for example. The second sealing portion 38 is suitably made of a highly airtight resin such as silicone resin or butyl rubber. The space 52 is filled with a dry gas (e.g., a dry rare gas such as argon gas or dry air).

A method for manufacturing the eleventh variation of the glass panel unit includes not only all of the process steps described above but also a second bonding step as well. The second bonding step includes hermetically bonding the first panel 1 and the third panel 3 (or the second panel 2 and the third panel 3) together via the second sealing portion 38 with the spacer 34 interposed between them.

In the eleventh variation, the third panel 3 is laid on top of the glass panel unit shown in FIGS. 1-3. However, this is only an example and should not be construed as limiting. Alternatively, the third panel 3 may also be laid on top of the glass panel unit having any of the configurations of the first through tenth variations described above.

[Building Component]

Figure 20:
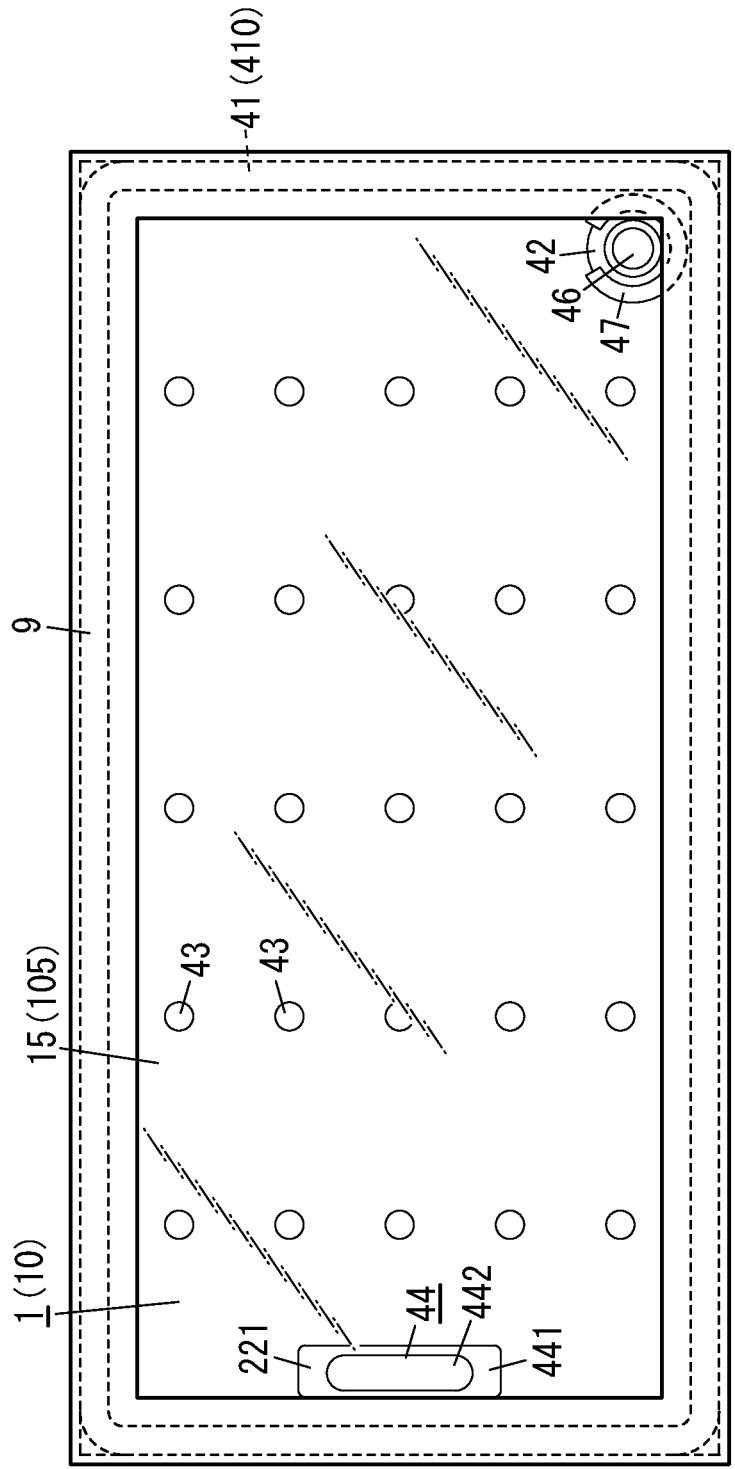
FIG. 20 is a plan view illustrating a building component including the glass panel unit.

FIG. 20 illustrates a building component including the glass panel unit according to the exemplary embodiment described above. In this building component, a frame 9 is fitted onto the glass panel unit shown in FIGS. 1-3.

For example, the frame 9 may be a window frame. In that case, the building component shown in FIG. 20 is a glass window including the glass panel unit according to the exemplary embodiment. The glass window does not have to be an openable window but may also be a fixed window such as a show window.

Furthermore, examples of building components including the glass panel unit according to the exemplary embodiment include not only glass windows but also entrance doors and interior doors as well.

A method for manufacturing a building component including the glass panel unit according to the exemplary embodiment includes not only the respective process steps of the method for manufacturing the glass panel unit according to the exemplary embodiment but also an assembling step as well. The assembling step includes fitting the rectangular frame 9 onto peripheral edges of the glass panel unit. A building component manufactured through these process steps exhibits excellent thermal insulation properties.

In the building component shown in FIG. 20, the frame 9 is fitted onto the glass panel unit shown in FIGS. 1-3. However, the frame 9 is not necessarily fitted onto that glass panel unit. Alternatively, the frame 9 may also be fitted onto the glass panel unit having any of the configurations of the first through eleventh variations described above.

Note that the glass panel unit and the building component including the glass panel unit are not limited to any one of the exemplary embodiment and variations thereof. For example, configurations of multiple ones of the variations described above may be adopted in combination as well.

[Implementations]

As can be seen from the foregoing description of an exemplary embodiment and its variations, a first implementation of a glass panel unit includes a first panel (1; 1a), a second panel (2; 2a), a sealing portion (41; 41a) in a frame shape, a plurality of pillars (43), and a gas adsorbent (44; 44a; 44b; 44c; 44d). The first panel (1; 1a) includes a glass pane (15; 15a). The second panel (2; 2a) includes another glass pane (25; 25a) and is arranged to face the first panel (1; 1a). The sealing portion (41; 41a) in the frame shape hermetically bonds respective peripheral edges of the first panel (1; 1a) and the second panel (2; 2a) together so as to create an evacuated, hermetically sealed space (51; 51a) between the first panel (1; 1a) and the second panel (2; 2a). The plurality of pillars (43) are arranged in the hermetically sealed space (51; 51a) to keep a gap distance between the first panel (1; 1a) and the second panel (2; 2a). The gas adsorbent (44; 44a; 44b; 44c; 44d) is placed in the hermetically sealed space (51; 51a). The gas adsorbent (44; 44a; 44b; 44c; 44d) contains: a non-metallic getter material having a porous structure with the ability to adsorb gas molecules; and a metallic getter material having a metallic surface with the ability to adsorb gas molecules.

The first implementation of the glass panel unit, including both a non-metallic getter material and a metallic getter material in its hermetically sealed space (51; 51a), is able to adsorb any of various types of gases produced in the hermetically sealed space (51; 51a), thus effectively reducing the chances of the degree of vacuum decreasing unintentionally in the hermetically sealed space (51; 51a). In addition, the first implementation of the glass panel unit is also able to cause, when the gas adsorbent (44; 44a; 44b; 44c; 44d) is heated in the hermetically sealed space (51; 51a), gas molecules desorbed from the non-metallic getter material to be adsorbed into, and diffused inside, the metallic getter material. This allows the first implementation of the glass panel unit to effectively activate, inside the hermetically sealed space (51; 51a), both of the non-metallic getter material and metallic getter material contained in the gas adsorbent (44; 44a; 44b; 44c; 44d) by heating these getter materials.

A second implementation of a glass panel unit, which may be implemented in conjunction with the first implementation, has the following additional feature. Specifically, in the second implementation of the glass panel unit, the non-metallic getter material is a zeolite-based, active carbon, or magnesium oxide getter material.

The second implementation of the glass panel unit allows the non-metallic getter material contained in the gas adsorbent (44; 44a; 44b; 44c; 44d) to effectively adsorb gas molecules of a hydrocarbon-based gas or ammonia gas.

A third implementation of a glass panel unit, which may be implemented in conjunction with the first or second implementation, has the following additional feature. Specifically, in the third implementation of the glass panel unit, the metallic getter material is a zirconium-based or titanium-based getter material.

The third implementation of the glass panel unit allows the metallic getter material contained in the gas adsorbent (44; 44a; 44b; 44c; 44d) to adsorb gas molecules of $H_2O$, $N_2$, $O_2$, $H_2$, or $CO_2$ gas, or any other gas.

A fourth implementation of a glass panel unit, which may be implemented in conjunction with any one of the first to third implementations, has the following additional feature. Specifically, in the fourth implementation of the glass panel unit, the gas adsorbent (44; 44a; 44b; 44c) is an integrated structure of a first gas adsorbent (441; 441a; 441b; 441c) containing the non-metallic getter material and a second gas adsorbent (442; 442a; 442b; 442c) containing the metallic getter material.

The fourth implementation of the glass panel unit allows the gas adsorbent (44; 44a; 44b; 44c) in which a first gas adsorbent (441; 441a; 441b; 441c) and a second gas adsorbent (442; 442a; 442b; 442c) are integrated together to effectively adsorb various types of gases.

A fifth implementation of a glass panel unit, which may be implemented in conjunction with any one of the first to third implementations, has the following additional feature. Specifically, in the fifth implementation of the glass panel unit, the gas adsorbent (44b) includes an integrated structure of a first gas adsorbent (441b) containing the non-metallic getter material, a second gas adsorbent (442b) containing the metallic getter material, and a sheet of metal (443).

The fifth implementation of the glass panel unit is able to heat, and thereby activate, both of the metallic getter material and the non-metallic getter material through the sheet of metal (443).

A sixth implementation of a glass panel unit, which may be implemented in conjunction with the fourth implementation, has the following additional feature. Specifically, in the sixth implementation of the glass panel unit, the second gas adsorbent (442c) is covered with the first gas adsorbent (441c).

The sixth implementation of the glass panel unit allows the gas adsorbent (44c) including an integrated structure of the first gas adsorbent (441c) and the second gas adsorbent (442c) to effectively reduce the chances of the degree of vacuum decreasing unintentionally in the hermetically sealed space (51).

A seventh implementation of a glass panel unit, which may be implemented in conjunction with any one of the first to third implementations, has the following additional feature. Specifically, in the seventh implementation of the glass panel unit, the gas adsorbent (44d) includes a first gas adsorbent (441d) containing the non-metallic getter material and a second gas adsorbent (442d) containing the metallic getter material. The first gas adsorbent (441d) and the second gas adsorbent (442d) are provided separately from each other.

The seventh implementation of the glass panel unit allows the non-metallic getter material and the metallic getter material to be heated and activated separately from each other.

An eighth implementation of a glass panel unit, which may be implemented in conjunction with any one of the first to seventh implementations, has the following additional feature. Specifically, in the eighth implementation of the glass panel unit, portions including a resin are exposed in the hermetically sealed space (51; 51a).

In the eighth implementation of the glass panel unit, a hydrocarbon-based gas or ammonia gas could be produced from the portions including a resin. However, the gas thus produced is adsorbed into the non-metallic getter material, thus reducing the chances of the degree of vacuum decreasing unintentionally in the hermetically sealed space (51; 51a).

A ninth implementation of a glass panel unit, which may be implemented in conjunction with the eighth implementation, has the following additional feature. Specifically, in the ninth implementation of the glass panel unit, the portions including the resin are the plurality of pillars (43).

The ninth implementation of the glass panel unit reduces the chances of heat being transferred through the pillars (43) between the first panel (1) and the second panel (2). The resin tends to produce a hydrocarbon-based gas or ammonia gas, which is adsorbed into the non-metallic getter material, thus reducing the chances of the degree of vacuum decreasing unintentionally in the hermetically sealed space (51).

A tenth implementation of a glass panel unit, which may be implemented in conjunction with any one of the first to ninth implementations, has the following additional feature. Specifically, the tenth implementation of the glass panel unit further includes a third panel (3) and a second sealing portion (38) in a frame shape. The third panel (3) includes still another glass pane (35) and is arranged to face one panel selected from the group consisting of the first panel (1; 1a) and the second panel (2; 2a). The second sealing portion (38) in the frame shape is hermetically bonded to the one panel and the third panel (3) so as to create a hermetically sealed space (52) between the one panel and the third panel (3).

The tenth implementation of the glass panel unit is able to exhibit further improved thermal insulation properties.

A first implementation of a building component includes: any one of the first to tenth implementations of the glass panel unit; and a frame (9) fitted onto peripheral edges of the glass panel unit.

The first implementation of the building component includes a glass panel unit with significantly improved thermal insulation properties.

A first implementation of a method for activating a gas adsorbent includes heating, inside the hermetically sealed space (51; 51a) created in any one of the first to tenth implementations of the glass panel unit, both of the non-metallic getter material and the metallic getter material that are contained in the gas adsorbent (44; 44a; 44b; 44c; 44d).

The first implementation of the gas adsorbent activating method allows gas molecules, desorbed from the non-metallic getter material, to be adsorbed into, and diffused inside, the metallic getter material. This allows both of the non-metallic getter material and the metallic getter material to be effectively activated inside the hermetically sealed space (51; 51a).

REFERENCE SIGNS LIST 1, 1a First Panel
15, 15a Glass Pane
2, 2a Second Panel
25, 25a Glass Pane
3 Third Panel
35 Glass Pane
38 Second Sealing Portion
41, 41a Sealing Portion
43 Pillar
44, 44a, 44b, 44c, 44d Gas Adsorbent
441, 441a, 441b, 441c, 441d First Gas Adsorbent
442, 442a, 442b, 442c, 442d Second Gas Adsorbent
51, 51a Hermetically Sealed Space
52 Space
9 Frame

The invention claimed is:

1. A glass panel unit manufacturing method comprising:
a providing step of providing a first substrate including a glass pane and a second substrate including another glass pane;
a pillar arrangement step of arranging a plurality of pillars on one surface of the second substrate;
a gas adsorbent placement step of placing a gas adsorbent on the second substrate;
a bonding step of bonding the first substrate and the second substrate together with a sealing material in a frame shape by heating in the furnace to a predetermined temperature higher than the melting point of the sealing material so as to create an internal space in which the plurality of pillars and the gas adsorbent are located between the first and second substrates and the sealing material;
an evacuating step of evacuating the internal space;
a sealing step of sealing the internal space while keeping the internal space evacuated; and
an activating step of heating the gas adsorbent placed in the internal space to a predetermined activation temperature,
the gas adsorbent including:
a first gas adsorbent containing a non-metallic getter material having a porous structure with the ability to adsorb gas molecules; and
a second gas adsorbent containing a metallic getter material having a metallic surface with the ability to adsorb gas molecules, and
the activating step including heating and activating the first gas adsorbent according to a heating temperature inside the furnace while performing the evacuating step inside the furnace, and activating the second gas adsorbent by locally heating the second gas adsorbent outside the furnace.

2. The glass panel unit manufacturing method of claim 1, wherein
the non-metallic getter material is a zeolite-based, active carbon, or magnesium oxide getter material.

3. The glass panel unit manufacturing method of claim 1, wherein the metallic getter material is a zirconium-based or titanium-based getter material.

4. The glass panel unit manufacturing method of claim 1, wherein
the first gas adsorbent and the second gas adsorbent being provided separately from each other.

5. The glass panel unit manufacturing method of claim 1, further comprising:
a third panel including still another glass pane and arranged to face one panel selected from the group consisting of the first panel constituted by the first substrate and the second panel constituted by the second substrate; and
a second sealing portion in a frame shape that is hermetically bonded to the one panel and the third panel so as to create a hermetically sealed space between the one panel and the third panel.

* * * * *